(12) United States Patent
Tamura et al.

(10) Patent No.: US 11,548,337 B2
(45) Date of Patent: Jan. 10, 2023

(54) IN-WHEEL MOTOR DRIVE DEVICE

(71) Applicant: NTN CORPORATION, Osaka (JP)

(72) Inventors: Shiro Tamura, Shizuoka (JP); Shinya Taikou, Shizuoka (JP)

(73) Assignee: NTN CORPORATION, Osaka (JP)

(*) Notice: Subject to any disclaimer, the term of this patent is extended or adjusted under 35 U.S.C. 154(b) by 313 days.

(21) Appl. No.: 16/334,865

(22) PCT Filed: Sep. 21, 2017

(86) PCT No.: PCT/JP2017/034059
§ 371 (c)(1),
(2) Date: Mar. 20, 2019

(87) PCT Pub. No.: WO2018/061967
PCT Pub. Date: Apr. 5, 2018

(65) Prior Publication Data
US 2020/0039308 A1    Feb. 6, 2020

(30) Foreign Application Priority Data

Sep. 30, 2016  (JP) .............................. JP2016-193754

(51) Int. Cl.
*B60G 3/28*    (2006.01)
*B60G 7/00*    (2006.01)
(Continued)

(52) U.S. Cl.
CPC .................. *B60G 3/28* (2013.01); *B60G 7/00* (2013.01); *B60K 7/0007* (2013.01);
(Continued)

(58) Field of Classification Search
CPC .... B60K 2007/0038; B60K 2007/0061; B60K 2007/0092; B60K 7/00; B60K 7/0007;
(Continued)

(56) References Cited

U.S. PATENT DOCUMENTS 5,087,229 A * 2/1992 Hewko ................ B60K 7/0007
180/65.51
5,382,854 A * 1/1995 Kawamoto ........... F16D 55/226
310/67 R (Continued)

FOREIGN PATENT DOCUMENTS

CN        102666171        9/2012
CN        102666173        9/2012
(Continued)

*Primary Examiner* — Emma K Frick
(74) *Attorney, Agent, or Firm* — Clark & Brody LP

(57) ABSTRACT

An in-wheel motor drive device (10) includes: a motor portion (21); a casing (43) housing a rotation transmission path from a motor rotation shaft of the motor portion to a rotating wheel; a suspending bracket (61) including an upper joining seat portion (62) joinable with an upper side suspension member (76) of a suspension device, a lower joining seat portion (64) joinable with a lower side suspension member (71) of the suspension device, and an intermediate portion (63) connecting the upper joining seat portion and the lower joining seat portion, and a fixing means (69) for mounting and fixing the suspending bracket (61) to an outer wall surface of the casing (43).

7 Claims, 25 Drawing Sheets

(51) Int. Cl.
  *B60K 7/00* (2006.01)
  *F16H 57/021* (2012.01)
  *F16H 57/02* (2012.01)

(52) U.S. Cl.
  CPC ....... *B60L 2220/44* (2013.01); *B60L 2220/46* (2013.01); *F16H 57/021* (2013.01); *F16H 2057/02034* (2013.01)

(58) Field of Classification Search
  CPC ...... B60K 17/043; B60K 17/046; B60G 3/28; B60G 7/00; F16H 57/021; F16H 2057/02034
  See application file for complete search history.

(56) References Cited

U.S. PATENT DOCUMENTS

| | | | | |
|---|---|---|---|---|
| 6,942,049 B2* | 9/2005 | Shimizu | ............... | B60K 7/0007 180/65.6 |
| 7,121,367 B2* | 10/2006 | Ajiro | ............... | B60K 7/0007 180/65.51 |
| 7,350,605 B2* | 4/2008 | Mizutani | ............... | B60K 7/0007 180/65.51 |
| 7,537,223 B2* | 5/2009 | Zetterstroem | ........... | B60G 3/265 280/5.52 |
| 7,641,010 B2* | 1/2010 | Mizutani | ............... | B60K 17/046 180/65.51 |
| 7,703,779 B2* | 4/2010 | Sumey | ............... | B60T 5/00 280/93.512 |
| 7,703,780 B2* | 4/2010 | Mizutani | ............... | B60G 13/16 280/124.1 |
| 7,789,178 B2* | 9/2010 | Mizutani | ............... | B60K 7/0007 180/65.51 |
| 7,938,212 B2* | 5/2011 | Sakuma | ............... | H02K 9/19 180/65.51 |
| 7,950,483 B2* | 5/2011 | Murata | ............... | B62D 7/18 180/65.6 |
| 7,958,959 B2* | 6/2011 | Yogo | ............... | B60K 7/0007 180/65.51 |
| 7,975,789 B2* | 7/2011 | Murata | ............... | B60G 7/005 180/65.6 |
| 8,132,636 B2* | 3/2012 | Suzuki | ............... | H02K 7/16 180/65.51 |
| 8,186,467 B2* | 5/2012 | Yoshino | ............... | B60K 7/0007 180/65.51 |
| 8,251,167 B2* | 8/2012 | Moriguchi | ............... | B60K 7/0007 180/65.51 |
| 8,573,615 B2* | 11/2013 | Kuwabara | ............... | B60G 3/20 280/124.145 |
| 8,863,874 B2* | 10/2014 | Lee | ............... | B60K 17/046 180/65.51 |
| 10,464,384 B2* | 11/2019 | Ishikawa | ............... | B60K 17/046 |
| 10,792,967 B2* | 10/2020 | Tamura | ............... | B60G 7/00 |
| 10,889,178 B2* | 1/2021 | Tamura | ............... | B60G 7/00 |
| 2007/0068715 A1 | 3/2007 | Mizutani | | |
| 2009/0133944 A1* | 5/2009 | Nishioka | ............... | B60G 3/20 180/65.51 |
| 2013/0057048 A1 | 3/2013 | Ishikawa et al. | | |
| 2013/0088068 A1 | 4/2013 | Walser et al. | | |

FOREIGN PATENT DOCUMENTS

| | | |
|---|---|---|
| CN | 102792563 | 11/2012 |
| CN | 105555573 | 5/2016 |
| CN | 107848397 | 3/2018 |
| EP | 3431316 | 1/2019 |
| EP | 3434504 | 1/2019 |
| JP | 3-31029 | 2/1991 |
| JP | 10-304645 | 11/1998 |
| JP | 2005-313815 | 11/2005 |
| JP | 2008-179316 | 8/2008 |
| JP | 2009-286296 | 12/2009 |
| JP | 2011-185286 | 9/2011 |
| JP | 5224507 | 7/2013 |
| JP | 5374326 | 12/2013 |
| JP | 2015-128931 | 7/2015 |
| JP | 2015-150928 | 8/2015 |
| JP | 2015-160530 | 9/2015 |
| JP | 2015-214273 | 12/2015 |
| JP | 2016-064762 | 4/2016 |
| JP | 6125083 | 5/2017 |

* cited by examiner

← VEHICLE WIDTH DIRECTION OUTSIDE   VEHICLE WIDTH DIRECTION INSIDE →

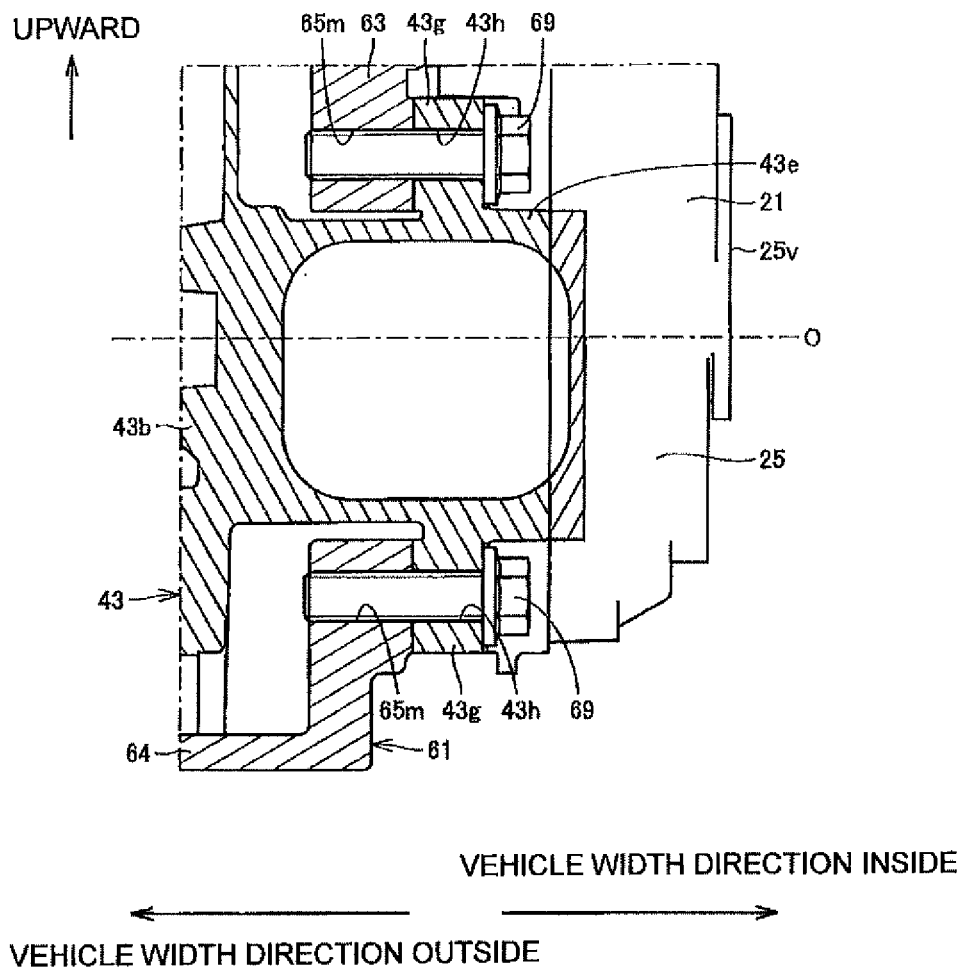

VEHICLE FRONT ←→ VEHICLE BACK

IN-WHEEL MOTOR DRIVE DEVICE

TECHNICAL FIELD

The present invention relates to a structure for joining an in-wheel motor drive device to a suspension device.

BACKGROUND ART

The in-wheel motor drive device arranged in an inner space region of a wheel is joined to a suspension device of a vehicle body side. As such a joining structure, for example, the one described in Japanese Unexamined Patent Publication No. 2015-214273 (Patent Literature 1) is known. The housing of the in-wheel motor described in Patent Literature 1 is composed of a housing body and a lid member. A socket of a ball joint is formed on the lid member. The socket houses a ball portion of a ball stud erected on a suspension member. Thus, the in-wheel motor is joined to the suspension member.

CITATION LIST

Patent Literatures

Patent Literature 1: Japanese Unexamined Patent Publication No. 2015-214273

SUMMARY OF INVENTION

Technical Problem

However, the inventor of the present invention has found that there is a need to further improve the versatility of the in-wheel motor in the above-described conventional joining structure. That is, recently there is a demand for component commonality (versatility) of desiring to mount common components for different vehicle types for reasons such as cost reduction. On the other hand, the dimensions of the suspension device and the wheel house differ according to the vehicle type. Therefore, even if a large number of in-wheel motors are produced and an attempt is made to provide them in common to different vehicle types, it is impossible to mount them or, even if they can be mounted, inconveniences such as mismatch in layout with peripheral members are caused. For example, the in-wheel motor described in Patent Literature 1 can be joined only to a specific vehicle type or suspension device described in the embodiment, and cannot be joined to other vehicle types or suspension devices, or even if it can be joined, the versatility was poor, for instance, the clearance with other members was not able to be secured sufficiently.

In view of the above circumstances, it is an object of the present invention to provide a highly versatile in-wheel motor drive device that can be provided in common for different vehicle types and different suspension devices.

Solution to Problem

To this end, an in-wheel motor drive device according to the present invention includes: a wheel hub bearing portion that has a rotating wheel integrally rotating with a wheel, a fixed wheel facing the rotating wheel via a radial gap, and a plurality of rolling elements interposed in the radial gap; a motor portion that drives the rotating wheel; a casing that houses a rotation transmission path from a motor rotation shaft of the motor portion to the rotating wheel; a suspending bracket that includes an upper joining seat portion and a lower joining seat portion joinable with a suspension device and an intermediate portion that connects the upper joining seat portion and the lower joining seat portion; and a fixing means for mounting and fixing the suspending bracket to an outer wall surface of the casing.

According to the present invention, it is possible to join the in-wheel motor drive device to different vehicle types and different suspension devices merely by replacing the suspending bracket, thereby improving the versatility of the in-wheel motor drive device. Further, the casing of the in-wheel motor drive device is reinforced by the suspending bracket, and the rigidity is increased. It is to be noted that the rotating wheel and the fixed wheel may be members having a circular cross section, and, not limited to the annular shape, either one may be a solid shaft. Supplementary explaining the suspending bracket, the upper joining seat portion is located relatively upper side and the lower joining seat portion is located relatively lower side. The intermediate portion extends in the vertical direction, joins with the upper joining seat portion on the upper side of the intermediate portion, and joins with the lower joining seat portion on the lower side of the intermediate portion. The suspending bracket may have any shape as long as it includes such an upper joining seat portion, an intermediate portion, and a lower joining seat portion, thus the shape of the suspending bracket is not particularly limited. While the suspension member of the suspension device joined with the upper joining seat portion or the lower joining seat portion is not particularly limited, the upper joining seat portion is joined with, for example, a strut or damper of the suspension device, and the lower joining seat portion is joined with, for example, a lower arm of the suspension device.

As one embodiment of the present invention, the suspending bracket further includes a tie rod joining seat portion for joining with a tie rod of a steering device. According to this embodiment, it is possible to turn the in-wheel motor drive device in different vehicle types. Further, the versatility of the in-wheel motor drive device is enhanced in different steering wheel suspension devices. In addition, in a single in-wheel motor drive device, the degree of freedom of the mounting layout of the tie rod is increased. As another embodiment, the tie rod may be omitted. Alternatively, as another embodiment, the tie rod joining seat portion may be provided in the casing of the in-wheel motor drive device.

As a preferred embodiment of the present invention, the suspending bracket further includes a brake caliper joining seat portion for joining with a brake caliper. According to this embodiment, it is possible to attach a brake caliper to the in-wheel motor drive device in different vehicle types. Further, in a single in-wheel motor drive device, the degree of freedom of the mounting layout of the brake caliper is increased.

As a further preferred embodiment of the invention, the fixing means includes a bolt extending in parallel with an axis of the rotating wheel and penetrating the suspending bracket and the casing. According to this embodiment, the suspending bracket can be mounted to the vehicle width direction inside portion of the in-wheel motor drive device.

As another embodiment, the fixing means includes a bolt extending in a vehicle front/rear direction and penetrating the suspending bracket and the casing. According to this embodiment, the suspending bracket can be mounted to the front portion or the rear portion of the in-wheel motor drive device. It is to be noted that in the following description, the front portion and the rear portion are based on the vehicle front/rear direction.

While the suspending bracket may be mounted along a flat surface of the casing, as a preferred embodiment, a raised portion may be provided to the casing in the front portion, the rear portion, or the vehicle width direction inside, a recess portion may be provided to the casing in the intermediate portion, and the suspending bracket may be mounted to the casing so that the recess portion receives the raised portion. This increases the rigidity of the mounting part. In the casing having a complicated shape, it is possible to firmly fix the suspending bracket using the raised portion of the casing.

As a more preferred embodiment, a plurality of projections are erected on the edge of the raised portion of the casing and a through hole is formed in each of the projections. Also, a through hole is formed in the suspending bracket at a part corresponding to the projection. Then, the through hole of the casing and the through hole of the suspending bracket are matched and bolted by passing through a bolt. The edge of the raised portion includes an upper edge, a lower edge, a front edge, and a rear edge. According to this embodiment, in the thin-walled casing, only the projections are thickened, thereby allowing the mounting rigidity to be increased. Further, it is possible to mount and fix the suspending bracket to the casing by screwing a bolt and a nut without providing a female screw hole in the casing.

Advantageous Effects of Invention

As described above, according to the present invention, the in-wheel motor drive device can be joined to different vehicle types and different suspension devices, and the versatility of the in-wheel motor drive device is enhanced. Therefore, it is possible to commonalize the in-wheel motor drive device to reduce the cost.

BRIEF DESCRIPTION OF DRAWINGS

FIG. 6B is a sectional view showing a variation of FIG. 6A.

DESCRIPTION OF EMBODIMENTS

Figure 1:
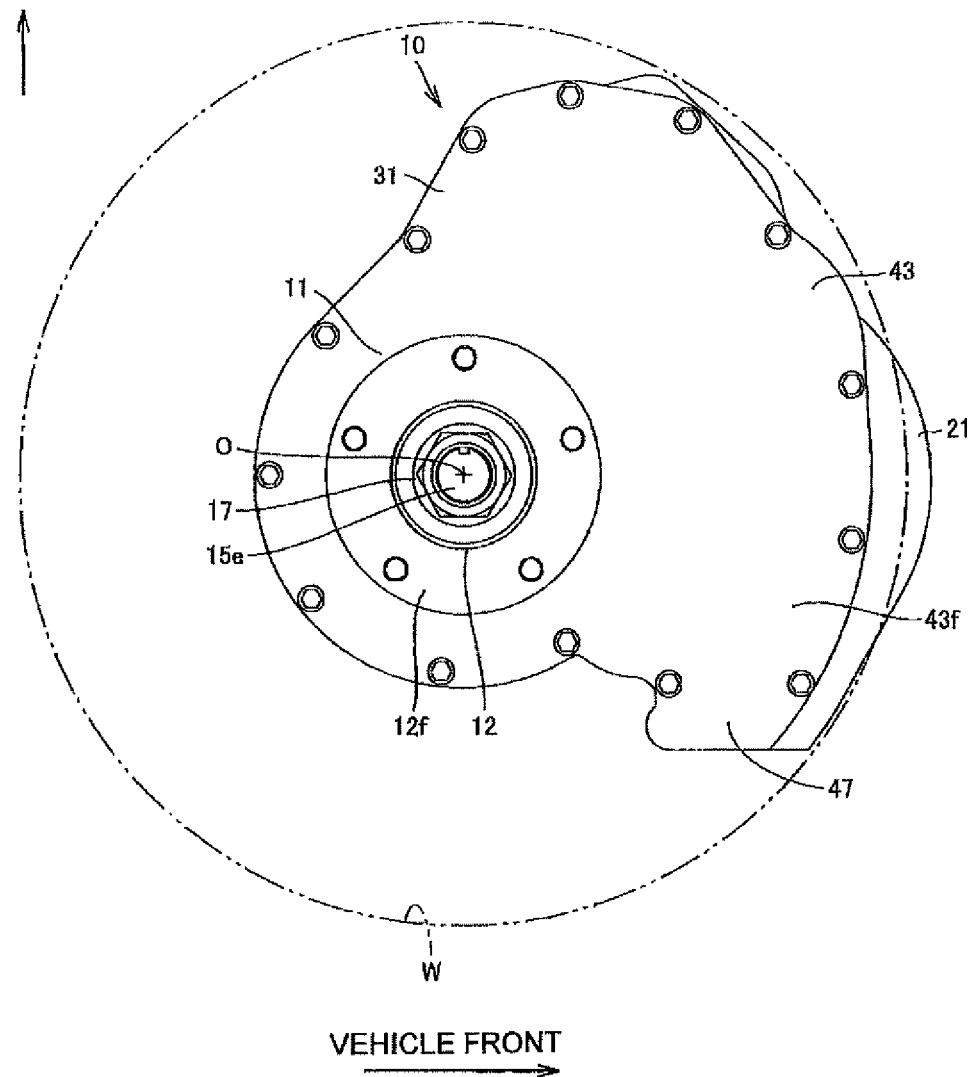
FIG. 1 is a front view schematically showing an in-wheel motor drive device.
Figure 2:
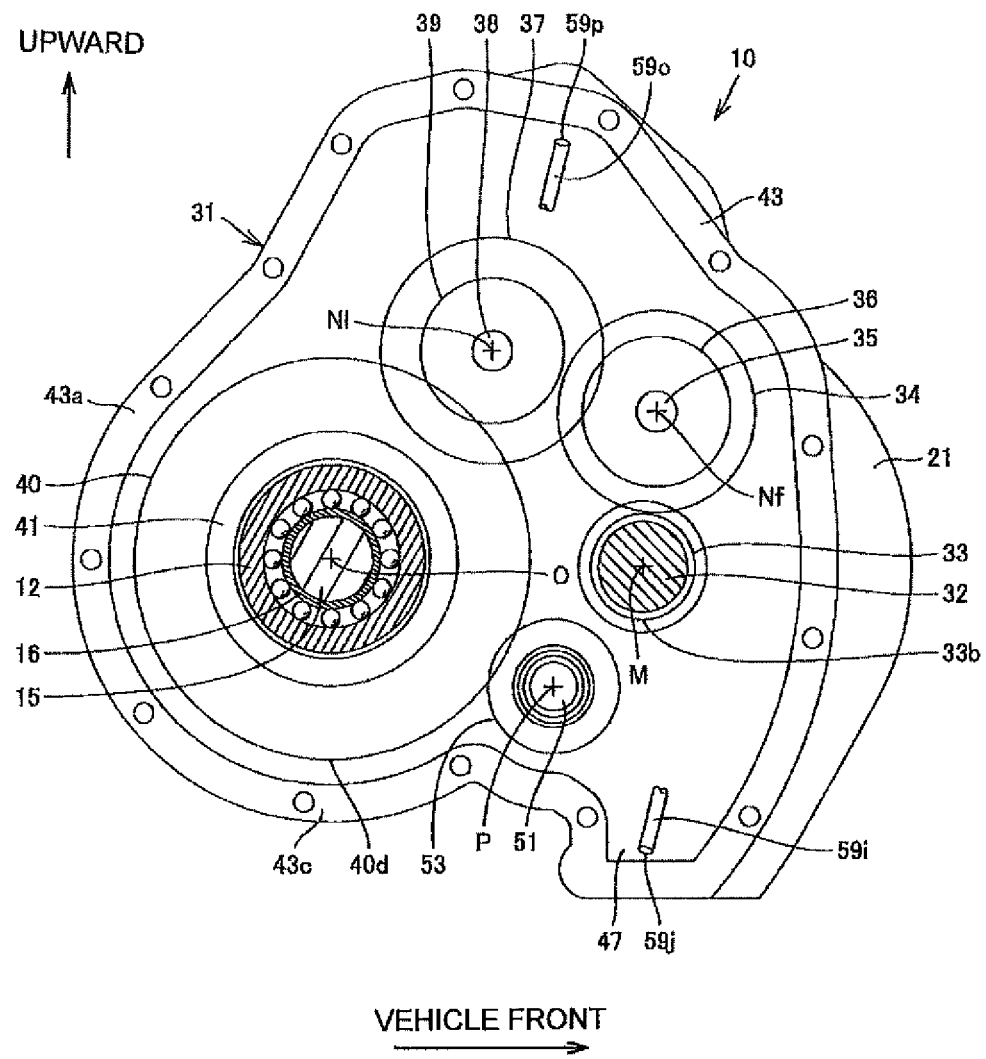
FIG. 2 is a transverse sectional view schematically showing an in-wheel motor drive device.
Figure 3:
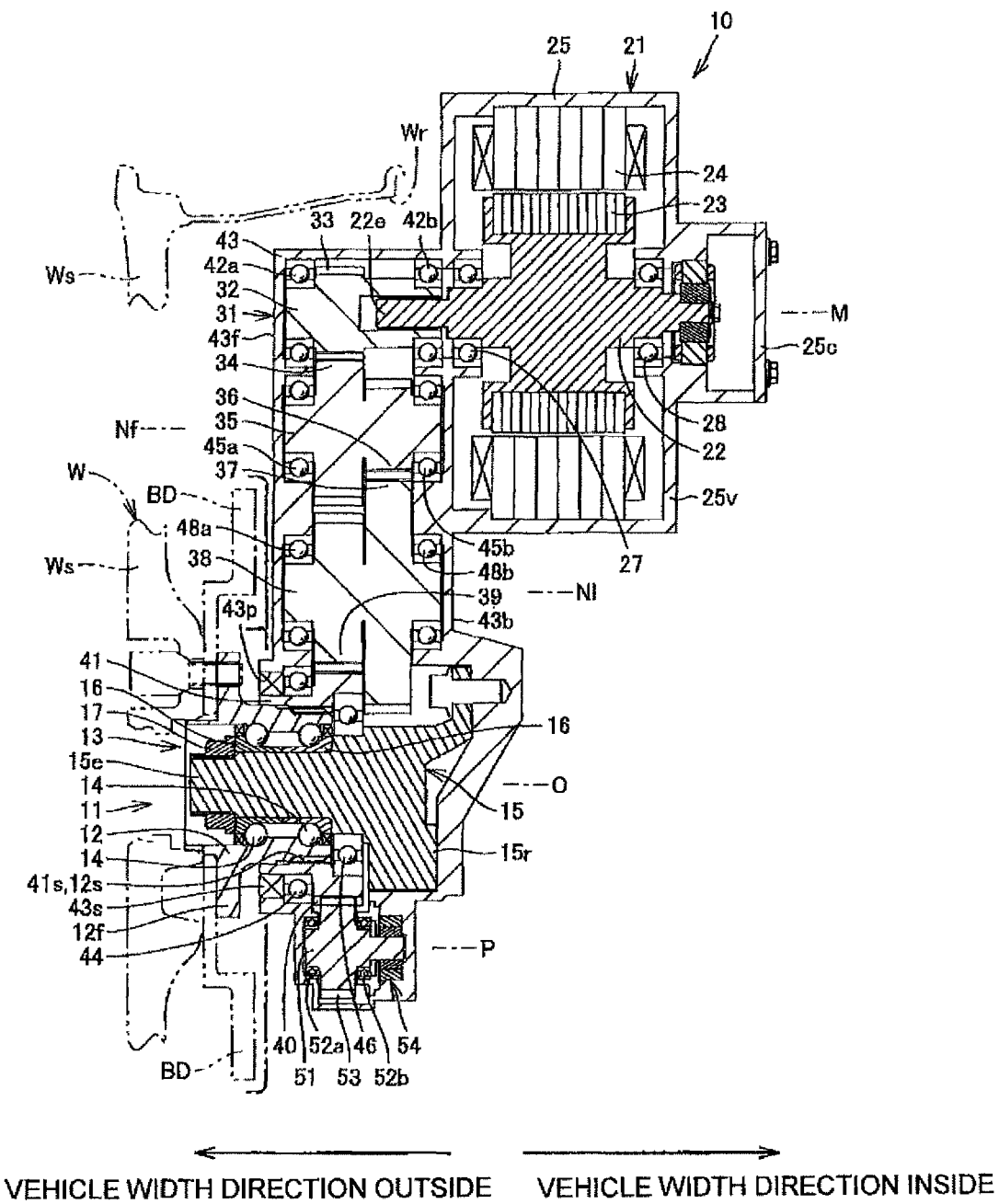
FIG. 3 is an expanded sectional view showing an in-wheel motor drive device.

Embodiments of the present invention will be described below in detail with reference to the drawings. First, an internal structure of an in-wheel motor drive device as the basis of the present invention will be described. FIG. 1 is a front view showing the in-wheel motor drive device. FIG. 2 is a transverse sectional view schematically showing the in-wheel motor drive device. FIG. 1 and FIG. 2 show a state of being viewed from the vehicle width direction outside. In FIG. 2, each gear inside of a speed reduction portion is represented by an addendum circle and illustration of each tooth is omitted. FIG. 3 is an expanded sectional view schematically showing the in-wheel motor drive device. The cut section shown by FIG. 3 is an expanded plane in which a plane including an axis M and an axis Nf shown in FIG. 2, a plane including the axis Nf and an axis Nl, a plane including the Nl and an axis O, and a plane including the axis O and an axis P are connected in this order.

An in-wheel motor drive device 10 includes a wheel hub bearing portion 11, a motor portion 21, and a speed reduction portion 31 that decelerates the rotation of the motor portion 21 and transmits the reduced rotation to the wheel hub bearing portion 11, and is arranged on the both vehicle width direction right and left sides of an electric vehicle (not shown). At this time, as shown in FIG. 3, the wheel hub bearing portion 11 is arranged on the vehicle width direction outside, and the motor portion 21 is arranged on the vehicle width direction inside.

The in-wheel motor drive device 10 is arranged in an inner space region of a road wheel W represented by an imaginary line in FIG. 1 and is joined with a center of the road wheel W represented by an imaginary line in FIG. 3, thereby driving the road wheel W of the wheel. Although not shown, a tire is mounted on the outer circumference of the road wheel W.

Each in-wheel motor drive device 10 is joined with the vehicle body of the electric vehicle via a suspension device not shown. The in-wheel motor drive device 10 is capable of causing an electric vehicle to run at a speed of 0 to 180 km/h on a public road.

As shown in FIG. 1 and FIG. 2, the motor portion 21 and the speed reduction portion 31 are not arranged coaxially with the axis O of the wheel hub bearing portion 11, but are arranged offset in a direction perpendicular from the axis O of the wheel hub bearing portion 11 as shown in FIG. 3. That is, the in-wheel motor drive device 10, as will be described in detail later, includes a portion arranged forward of the vehicle, a portion arranged rearward of the vehicle, a portion arranged upward, and a portion arranged downward.

As shown in FIG. 3, the wheel hub bearing portion 11 includes an outer ring 12 as a rotating wheel coupled with the road wheel W, an inner fixing member 13 as a fixed wheel passed through a center hole of the outer ring 12, and a plurality of rolling elements 14 arranged in an annular radial gap between the outer ring 12 and the inner fixing member 13, and thus constituting an axle. The inner fixing member 13 includes a non-rotating fixed shaft 15, a pair of inner races 16, and a retaining nut 17. A root portion 15$r$ of the fixed shaft 15 is formed to have a larger diameter than an end portion 15$e$. The inner race 16 is fitted to the outer circumference of the fixed shaft 15 between the root portion 15$r$ and the end portion 15$e$. The retaining nut 17 is threadedly engaged with the end portion 15$e$ of the fixed shaft 15 to fix the inner race 16 between the retaining nut 17 and the root portion 15$r$.

The fixed shaft 15 extends along the axis O and passes through a main body casing 43 forming an outline of the wheel hub bearing portion 11 and the speed reduction portion 31. The end portion 15$e$ of the fixed shaft 15 passes through an opening 43$p$ formed in a front surface portion 43$f$ of the main body casing 43 and protrudes to a more vehicle width direction outside than the front portion 43$f$. The root portion 15$r$ of the fixed shaft 15 is covered with a back surface portion 43$b$ of the main body casing 43 from the vehicle width direction inside. It is to be noted that the front surface portion 43$f$ and the back surface portion 43$b$ are casing wall portions facing each other spaced in the axis O direction.

The rolling elements 14 are arranged in double rows separated in the axis O direction. The outer circumferential surface of the inner races 16 of one side of the axis O direction constitutes an inner raceway surface of the rolling elements 14 of the first row and faces the inner circumferential surface of one side of the axis O direction of the outer ring 12. The outer circumferential surface of the inner races 16 of the other side of the axis O direction constitutes an inner raceway surface of the rolling elements 14 of the second row and faces the inner circumferential surface of the other side of the axis O direction of the outer ring 12. In the following description, the vehicle width direction outside (outboard side) is also referred to as one side of the axis O direction and the vehicle width direction inside (inboard side) is also referred to as the other side of the axis O direction. The right/left direction of the page of FIG. 3 corresponds to the vehicle width direction. The inner circumferential surface of the outer ring 12 constitutes an outer raceway surface of the rolling elements 14.

One end of the axis O direction of the outer ring 12 protrudes to a more vehicle width direction outside than the front portion 43$f$. A flange portion 12$f$ is formed at the one end of the axis O direction. The flange portion 12$f$ constitutes a coupling seat portion for coupling coaxially with a brake disc BD and a spoke portion Ws of the road wheel W. The outer ring 12 is coupled with the brake disc BD and the road wheel W at the flange portion 12$f$ and rotates integrally with the road wheel W. As a variation that is not illustrated, the flange portion 12$f$ may be a protruding portion that protrudes towards the outer diameter side spaced in the circumferential direction.

As shown in FIG. 3, the motor portion 21 includes a motor rotation shaft 22, a rotor 23, a stator 24, and a motor casing 25, which are sequentially arranged from the axis M of the motor portion 21 to the outer diameter side in this order. While the motor portion 21 is a radial gap motor of an inner rotor and an outer stator type, it may be of another type. For example, though not illustrated, the motor portion 21 may be an axial gap motor.

The axis M that becomes a rotation center of the motor rotation shaft 22 and the rotor 23 extends in parallel to the axis O of the wheel hub bearing portion 11. That is, the motor portion 21 is arranged so as to be offset away from the axis O of the wheel hub bearing portion 11. Most axial direction position of the motor portion 21 excluding the end portion of the motor rotation shaft 22 does not overlap with the axis O direction position of the inner fixing member 13 as shown in FIG. 3. The motor casing 25 has a substantially cylindrical shape, and is coupled with the back surface portion 43$b$ of the main body casing 43 at one end in the axis M direction and sealed with a bowl-shaped motor casing cover 25$v$ at the other end in the axis M direction. Both end portions of the motor rotation shaft 22 are rotatably supported by the motor casing 25 via rolling bearings 27 and 28. The motor portion 21 drives the outer ring 12.

The speed reduction portion 31 includes an input shaft 32, an input gear 33, an intermediate gear 34, an intermediate shaft 35, an intermediate gear 36, an intermediate gear 37, an intermediate shaft 38, an intermediate gear 39, an output gear 40, an output shaft 41, and the main body casing 43. The input shaft 32 is a tubular body having a larger diameter than the end portion 22$e$ of the motor rotation shaft 22 and extends along the axis M of the motor portion 21. The end portion 22$e$ is received in the center hole of the other end portion of the axis M direction of the input shaft 32, and the input shaft 32 is coupled coaxially with the motor rotation shaft 22. Both ends of the input shaft 32 are supported by the main body casing 43 via rolling bearings 42$a$ and 42$b$. More specifically, one end of the axis M direction of the input shaft 32 is supported by the front surface portion 43$f$ via the rolling bearing 42$a$, and the other end of the axis M direction of the input shaft 32 is supported by the back surface portion 43$b$ via the rolling bearing 42$b$. The input gear 33 is an externally toothed gear having a diameter smaller than the motor portion 21, and is coupled coaxially with the input shaft 32. More specifically, the input gear 33 is integrally formed on the outer circumference of the center portion of the axis M direction of the input shaft 32.

The output shaft 41 is a tubular body having a larger diameter than the outer ring 12 and extends along the axis O of the wheel hub bearing portion 11. The other end of the axis O direction of the outer ring 12 is received in the center hole at one end of the axis O direction of the output shaft 41 and the output shaft 41 is coupled coaxially with the outer ring 12. Specifically, a spline groove 41$s$ is formed on the inner circumferential surface of the output shaft 41, a spline groove 12$s$ is formed on the outer circumferential surface of the other end of the axis O direction of the outer ring 12, and these spline grooves 41$s$ and 12$s$ are spline-fitted. Such spline fitting realizes torque transmission between the output shaft 41 and the outer ring 12 and allows relative movement therebetween.

One end of the axis O direction of the output shaft 41 is supported by the main body casing 43 via a rolling bearing 44. The other end of the axis O direction of the output shaft 41 is supported by the root portion 15r of the fixed shaft 15 via a rolling bearing 46. The output gear 40 is an externally toothed gear, and is coupled coaxially with the output shaft 41. More specifically, the output gear 40 is integrally formed on the outer circumference of the other end of the axis O direction of the output shaft 41.

The two intermediate shafts 35 and 38 extend in parallel to the input shaft 32 and the output shaft 41. That is, the speed reduction portion 31 is a four-axis parallel shaft gear reducer, and the axis O of the output shaft 41, the axis Nf of the intermediate shaft 35, the axis Nl of the intermediate shaft 38, and the axis M of the input shaft 32 extend in parallel to each other, in other words, extend in the vehicle width direction.

The vehicle front/rear direction position of each axis will now be described. As shown in FIG. 2, the axis M of the input shaft 32 is arranged in the vehicle ahead of the axis O of the output shaft 41. Further, the axis Nf of the intermediate shaft 35 is arranged in the vehicle ahead of the axis M of the input shaft 32. The axis Nl of the intermediate shaft 38 is arranged in the vehicle ahead of the axis O of the output shaft 41 and behind of the axis M of the input shaft 32. As a variation that is not shown, the axis M of the input shaft 32 is arranged at an arbitrary position around the axis O, and the input shaft 32, the intermediate shaft 35, the intermediate shaft 38, and the output shaft 41 may be arranged in the vehicle front/rear direction in this order. In this case, the vertical direction position of each axis is determined by the front/rear direction position and the vertical direction position of the motor portion 21. Each of the shafts 32, 35, 38, and 41 constitutes a transmission order of the driving force in this order.

The vertical direction position of each axis will now be described. The axis M of the input shaft 32 and the axis O of the output shaft 41 are arranged at substantially the same vertical direction position. The axis Nf of the intermediate shaft 35 is arranged further upward than the axis M of the input shaft 32. The axis Nl of the intermediate shaft 38 is arranged further upward than the axis Nf of the intermediate shaft 35. It is to be noted that it is sufficient for the plurality of intermediate shafts 35 and 38 to be arranged further upward than the input shaft 32 and the output shaft 41, and the intermediate shaft 35 may be arranged further upward than the intermediate shaft 38 as a variation that is not shown. Alternatively, as a variation that is not shown, the output shaft 41 may be arranged further upward than the input shaft 32. In the example of variation in which the axis M of the input shaft 32 is arranged at the above-described arbitrary position around the axis O, the vertical direction positions of the input shaft 32, the intermediate shaft 35, the intermediate shaft 38, and the output shaft 41 are determined by the front/rear direction position and the vertical direction position of the motor.

The intermediate gear 34 and the intermediate gear 36 are externally toothed gears and are coupled coaxially with the center portion of the axis Nf direction of the intermediate shaft 35 as shown in FIG. 3. Both end portions of the intermediate shaft 35 are supported by the main body casing 43 via rolling bearings 45a and 45b. More specifically, one end of the axis Nf direction of the intermediate shaft 35 is supported by the front surface portion 43f via the rolling bearing 45a, and the other end of the axis Nf direction of the intermediate shaft 35 is supported by the back surface portion 43b via the rolling bearing 45b. The intermediate gear 37 and the intermediate gear 39 are externally toothed gears and are coupled coaxially with the center portion of the axis Nl direction of the intermediate shaft 38. Both end portions of the intermediate shaft 38 are supported by the main body casing 43 via rolling bearings 48a and 48b. More specifically, one end of the axis Nl direction of the intermediate shaft 38 is supported by the front surface portion 43f via the rolling bearing 48a, and the other end of the axis Nl direction of the intermediate shaft 38 is supported by the back surface portion 43b via the rolling bearing 48b.

The main body casing 43 forms an outline of the speed reduction portion 31 and the wheel hub bearing portion 11, is formed in a tubular shape, and surrounds the axes O, Nf, Nl, and M that extend in parallel to each other as shown in FIG. 2. Also, the main body casing 43 is housed in the inner space region of the road wheel W (FIG. 1). As shown in FIG. 3, the inner space region of the road wheel W is partitioned by an inner circumferential surface of a rim portion Wr and a spoke portion Ws coupled with one end of the axis O direction of the rim portion Wr. The wheel hub bearing portion 11, the speed reduction portion 31, and one axial direction region of the motor portion 21 are housed in the inner space region of the road wheel W. The other axial direction region of the motor portion 21 protrudes to the other axial direction from the road wheel W. Thus, the road wheel W houses most of the in-wheel motor drive device 10.

With reference to FIG. 2, the main body casing 43 protrudes downward in a position spaced apart in the vehicle front/rear direction from the axis O of the output gear 40, more specifically, immediately below the axis M of the input gear 33. This protruding portion forms an oil tank 47. On the other hand, a space is secured between a portion 43c immediately below the axis O of the main body casing 43 and a lower portion of the rim portion Wr. A suspension member (not shown) extending in the vehicle width direction is arranged in this space.

The tubular main body casing 43, as shown in FIG. 3, houses the input shaft 32, the input gear 33, the intermediate gear 34, the intermediate shaft 35, the intermediate gear 36, the intermediate gear 37, then intermediate shaft 38, the intermediate gear 39, the output gear 40, and the output shaft 41, and covers the other end of the axis O direction of the wheel hub bearing portion 11. Lubricating oil is sealed inside the main body casing 43. The input gear 33, the intermediate gear 34, the intermediate gear 36, the intermediate gear 37, the intermediate gear 39, and the output gear 40 are helical gears.

As shown in FIG. 3, the main body casing 43 includes the substantially flat front surface portion 43f covering one side of the axial direction of the tubular portion of the speed reduction portion 31 and the substantially flat back surface portion 43b covering the other side of the axial direction of the tubular portion of the speed reduction portion 31. The back surface portion 43b is coupled with the motor casing 25. Further, the back surface portion 43b is coupled with the suspension member not shown such as an arm and a damper via a suspending bracket 61 (FIG. 4, etc.) described later. As a result, the in-wheel motor drive device 10 is joined to the suspension device. It is to be noted that the arm, the damper, and the like of the suspension device are also referred to as vehicle body side members because they are mounted to the vehicle body side as viewed from the described member, i.e., here the in-wheel motor drive device 10. Since the main body casing 43, the motor casing 25, and the motor casing cover 25v are joined to the vehicle body side member via the suspending bracket, they are separated from the vehicle body side member.

The opening 43p through which the outer ring 12 passes is formed in the front surface portion 43f. The opening 43p is provided with a sealing material 43s for sealing the radial gap with the outer ring 12. Therefore, the outer ring 12 to be a rotating body is housed in the main body casing 43 except for one end portion of the axis O direction.

The small-diameter input gear 33 and the large-diameter intermediate gear 34 are arranged on one side (on the flange section 12f side) in the axial direction of the speed reduction portion 31 and engage with each other. The small-diameter intermediate gear 36 and the large-diameter intermediate gear 37 are arranged on the other side (on the motor portion 21 side) in the axial direction of the speed reduction portion 31 and engage with each other. The small-diameter input gear 39 and the large-diameter intermediate gear 40 are arranged on one side (on the flange section 12f side) in the axial direction of the speed reduction portion 31 and engage with each other. In this way, the input gear 33, the plurality of intermediate gears 34, 36, 37, and 39 and the output gear 40 engage with each other and constitute a drive transmission path leading from the input gear 33 to the output gear 40 via the plurality of intermediate gears 34, 36, 37, and 39. By the engagement of the drive side small-diameter gears and the driven side large-diameter gears, the rotation of the input shaft 32 is decelerated by the intermediate shaft 35, the rotation of the intermediate shaft 35 is decelerated by the intermediate shaft 38, and the rotation of the intermediate shaft 38 is decelerated by the output shaft 41. As a result, the speed reduction portion 31 secures a sufficient reduction ratio. Among the plurality of intermediate gears, the intermediate gear 34 becomes the first intermediate gear located on the input side of the drive transmission path. Among the plurality of intermediate gears, the intermediate gear 39 becomes the final intermediate gear located on the output side of the drive transmission path.

According to the present embodiment, as shown in FIG. 2, the output shaft 41, the intermediate shaft 38, and the input shaft 32 are arranged in this order spaced in the vehicle front/rear direction. Further, the intermediate shaft 35 and the intermediate shaft 38 are arranged further upward than the input shaft 32 and the output shaft 41. According to this embodiment, it is possible to arrange the intermediate shaft above the outer ring 12 to be a rotating wheel, to secure a space for arranging the oil tank 47 below the outer ring 12, and to secure a space immediately under the outer ring 12. Therefore, it is possible to provide the steering axis extending in the vertical direction that intersects in a space immediately under the outer ring 12, so that the road wheel W and the in-wheel motor drive device 10 can suitably be steered around the steering axis.

Further, according to the present embodiment, as shown in FIG. 3, the input shaft 32 and the output shaft 41 extend in the vehicle width direction, and as shown in FIG. 2, the input gear 33 and the output gear 40 are set in an upright attitude in the vertical direction. A lower edge 40d of the output gear 40 is arranged further downward than a lower edge 33b of the input gear 33. As a result, the input gear 33 rotating at a high speed does not be immersed in the lubricating oil stored in the lower part of the speed reduction portion 31 inside the main body casing 43, and the stirring resistance of the input gear 33 can be avoided.

Further, according to the present embodiment, as shown in FIG. 2, the plurality of intermediate shafts 35 and 38 include the first intermediate shaft 35, which is arranged above and next to the input shaft 32 and to which driving torque is supplied from the input shaft 32, and the final intermediate shaft 38, which is arranged above and next to the output shaft 41 and from which driving torque is supplied to the output shaft 4L The input shaft 32, the first intermediate shaft 35, the final intermediate shaft 38, and the output shaft 41 are arranged so that a reference line that serially connects the center (the axis M) of the input shaft, the center (the axis Nl) of the first intermediate shaft 35, the center (the axis Nl) of the final intermediate shaft 38, and the center (the axis O) of the output shaft 41 draws an inverted U shape, as viewed in the axial direction of the plurality of intermediate shafts 35 and 38. As a result, the overall arrangement of the plurality of shafts and gears constituting the drive transmission path is downsized so that the plurality of shafts and gears can be housed inside the road wheel W.

Further, according to the present embodiment, as shown in FIG. 3, the outer ring 12 to be a rotating wheel is a tubular body, and the wheel hub bearing portion 11 further includes the fixed shaft 15, which is arranged in the center hole of the outer ring 12 and rotatably supports the outer ring 12. Due to this, the output gear 40 can be coupled coaxially to the outer diameter side of the outer ring 12. Then, it is possible to transmit the driving force from the intermediate shaft 38 arranged offset from the outer ring 12 to the outer ring 12.

As shown in FIG. 3, the main body casing 43 further houses a pump shaft 51, rolling bearings 52a and 52b, a pump gear 53, and an oil pump 54. An axis P of the pump shaft 51 extends in parallel with the axis O of the output shaft 41. Further, the pump shaft 51 is arranged away in the vehicle front/rear direction from the output shaft 41, is supported rotatably via the rolling bearings 52a and 52b on both sides of the axis P direction, and is coupled coaxially with the pump gear 53 in the center portion of the axis P direction. The pump gear 53 is an externally toothed gear, is a helical gear, and is driven by the output gear 40 in engagement with the output gear 40.

The oil pump 54 is arranged more in the other side of the axis P direction than the rolling bearing 52b and is provided at the other end of the axis P direction of the pump shaft 51. The oil pump 54 is connected to a suction oil passage 59i and a discharge oil passage 59O shown in FIG. 2 (connection portion not shown). The suction oil passage 59i extends downward from the oil pump and reaches the oil tank 47, and a suction port 59j at the lower end of the suction oil passage 59i is arranged near the bottom wall of the oil tank 47. The discharge oil passage 59O extends upward from the oil pump, and a discharge port 59p at the upper end of the discharge oil passage 59O is arranged at a position higher than the intermediate gear 37.

As the oil pump 54 is driven by the output gear 40, the oil pump 54 sucks the lubricating oil of the oil tank 47 through the suction port 59j, and discharges the sucked lubricating oil through the discharge port 59p. The discharge port 59p is located higher than all the gears (the input gear 33, the intermediate gears 34, 36, 37, and 39, and the output gear 40), and supplies lubricating oil to these gears from above. Further, the lubricating oil is injected from the discharge oil passage 59O into the inside of the motor portion 21. As a result, the motor portion 21 and the speed reduction portion 31 are lubricated and cooled.

With reference to FIG. 2, the pump shaft 51 of the present embodiment is arranged downward of the input shaft 32, and the oil tank 47 is arranged downward of the pump shaft 51. The oil pump 54 is arranged substantially coaxially with the pump shaft 51, and pumps up the lubricating oil stored in the oil tank 47 to immediate upward of the oil tank 47. The pump shaft 51 and the oil tank 47 are arranged in the vehicle ahead of the output shaft 41. When the road wheel W is driven by the in-wheel motor drive device 10 and the electric vehicle travels, the oil tank 47 receives the traveling wind from the front of the vehicle and is air-cooled.

Next, the suspending bracket of the in-wheel motor drive device will be described.

Figure 4:
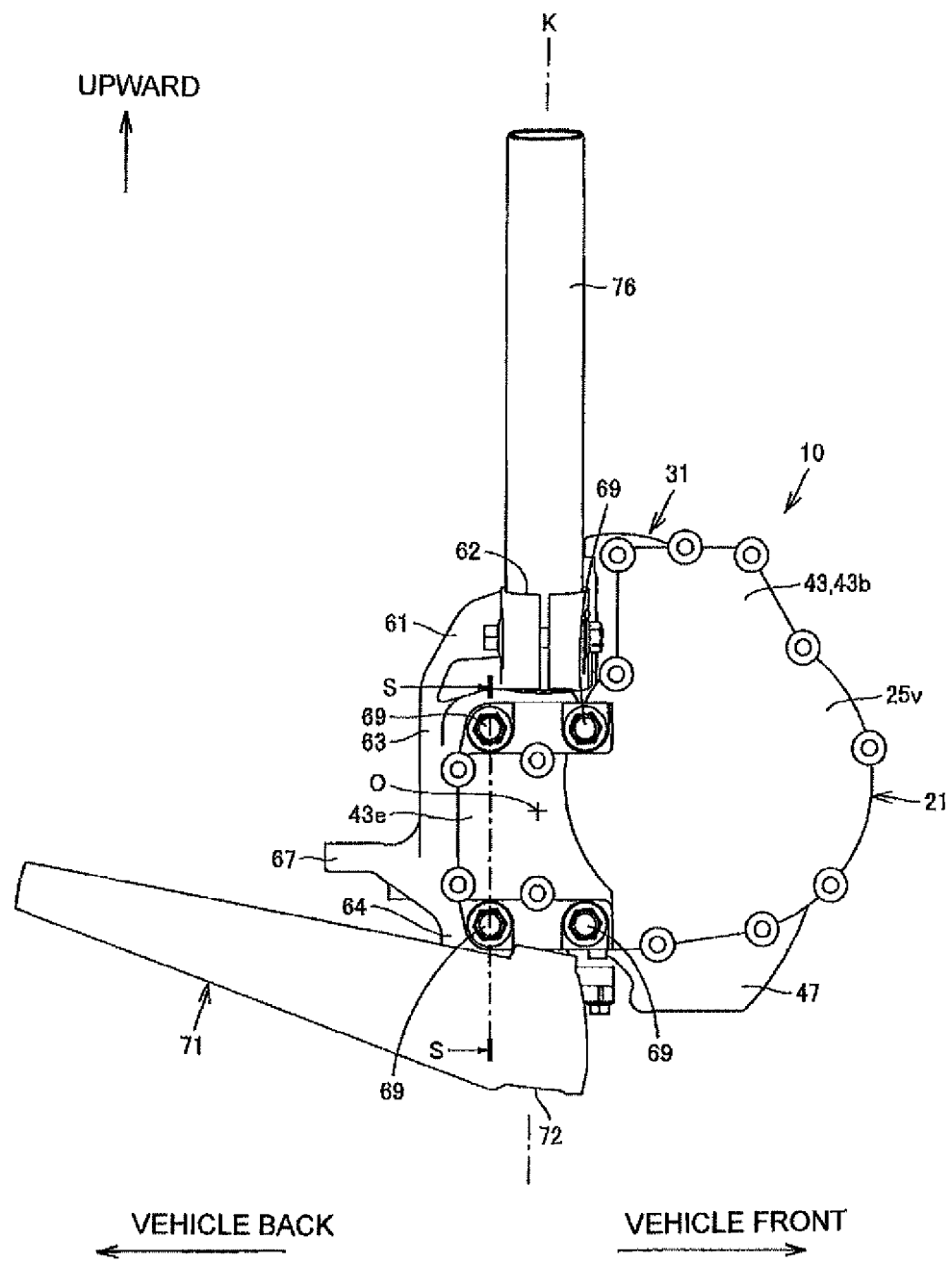
FIG. 4 is a rear view showing the in-wheel motor drive device according to a first embodiment of the present invention.
Figure 5:
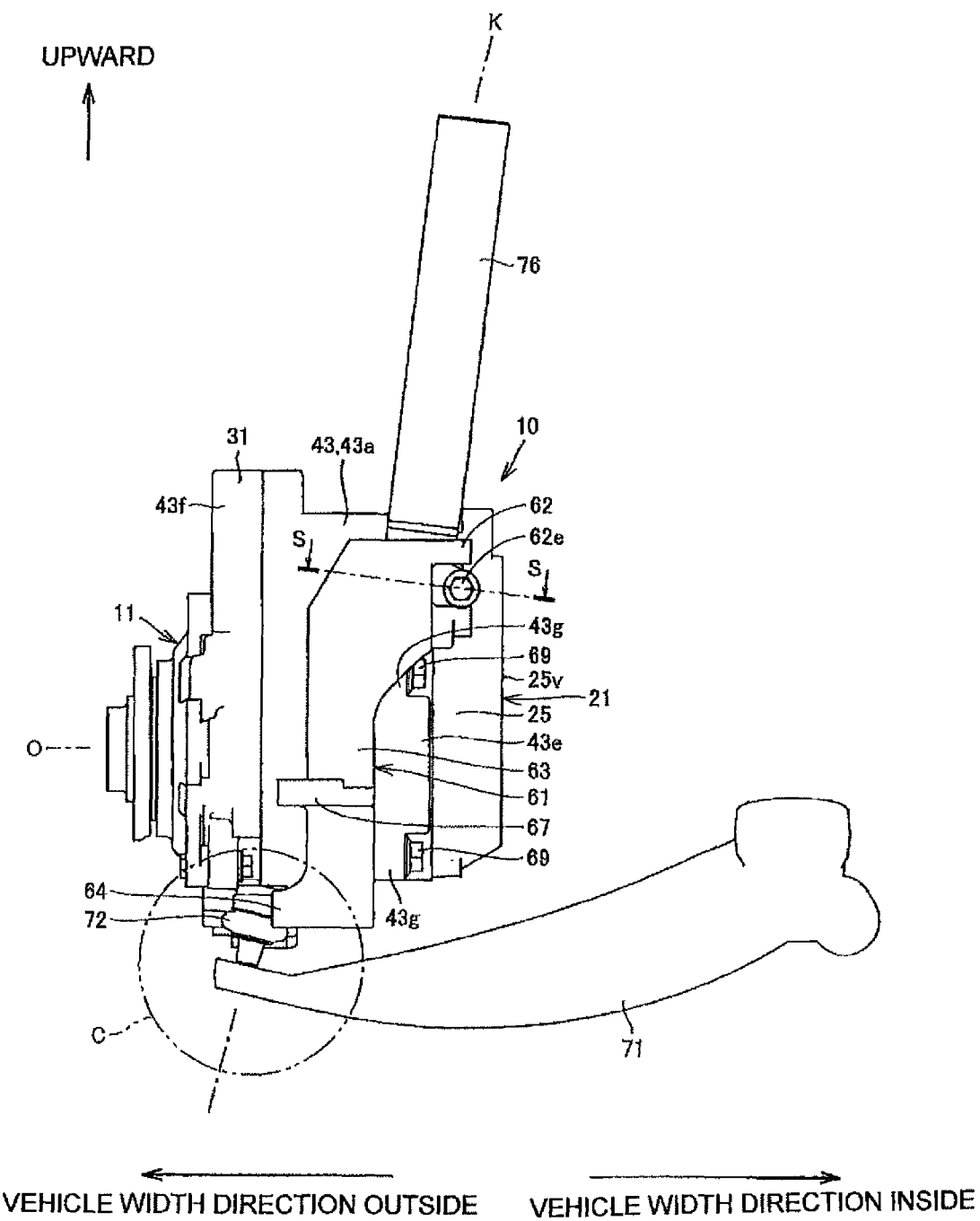
FIG. 5 is a side view showing the first embodiment.
Figure 6A:
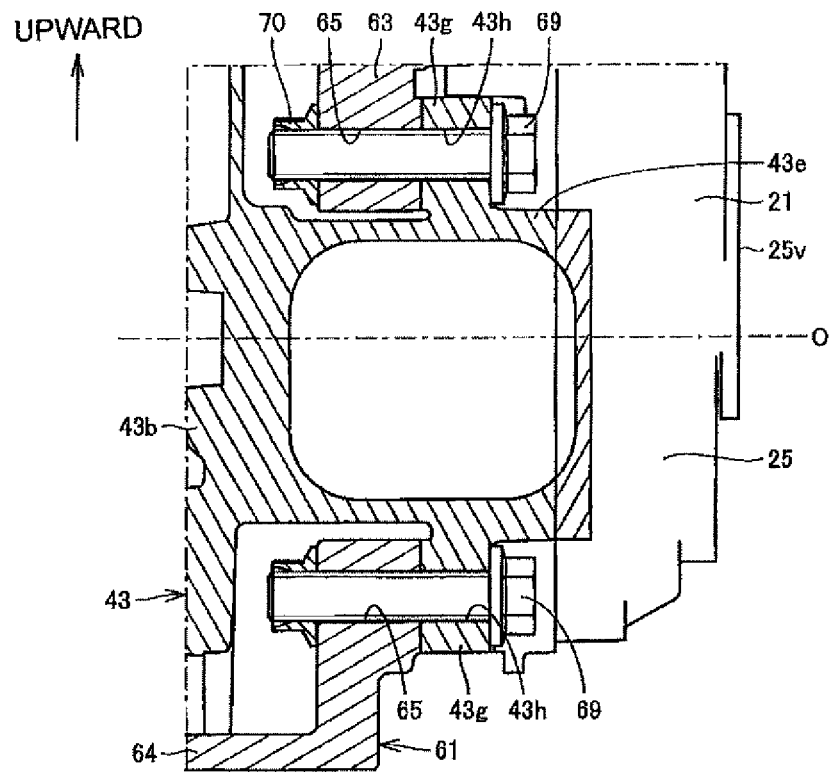
FIG. 6A is a sectional view showing a part of the first embodiment.
Figure 7:
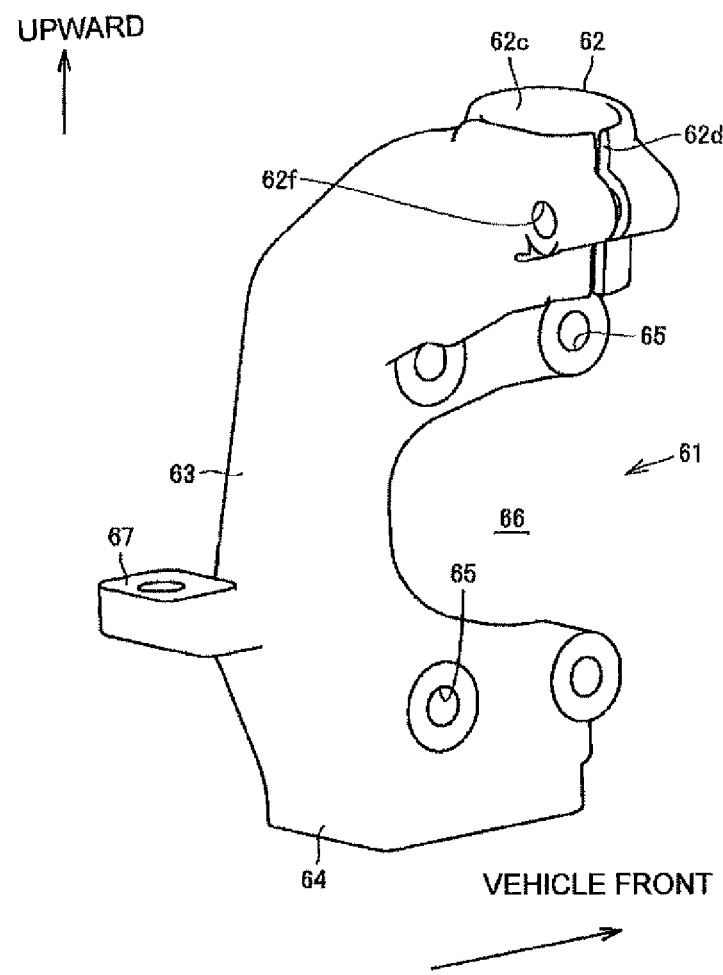
FIG. 7 is a perspective view showing a suspending bracket taken out from the first embodiment.

FIG. 4 is a rear view showing the in-wheel motor drive device according to the first embodiment of the present invention together with the suspension device, and shows a state of being viewed from the vehicle width direction inside. FIG. 5 is a side view showing the same embodiment together with the suspension device, and shows a state of being viewed from the rear of the vehicle. FIG. 6A is a sectional view showing a part of the same embodiment and showing a cross section of the in-wheel motor drive device being cut along the plane S-S in FIG. 4, viewed in the direction of the arrow. It is to be noted that although the section S-S does not include the axis O, the axis O is shown in order to facilitate understanding of the vertical position. FIG. 7 is a perspective view showing a suspending bracket taken out from the same embodiment. As shown in FIG. 4 and FIG. 5, the suspending bracket 61 is attached to the main body casing 43 of the present embodiment. Regarding the axis O direction position, the wheel hub bearing portion 11, the speed reduction portion 31, and the suspending bracket 61 are arranged in this order. The axis O direction position of the suspending bracket 61 overlaps with the axis O direction position of the motor portion 21. Regarding the vehicle front/rear direction position, the motor section 21 is arranged ahead and the suspending bracket 61 is arranged behind.

As shown in FIG. 7, the suspending bracket 61 includes an upper joining seat portion 62, a lower joining seat portion 64, and an intermediate portion 63. As shown in FIG. 5, the upper joining seat portion 62 is provided at the upper end portion of the suspending bracket 61, and is joined with the lower end of the upper side suspension member, for example, a strut 76. The strut 76 constitutes an upper side suspension member of the strut type suspension device, and is a shock absorber including a damper extending in the vertical direction and a coil spring (not shown) attached to the damper. In addition, the upper side suspension member may be composed of an upper arm or a plurality of links as another embodiment.

The lower joining seat portion 64 is provided at the lower end portion of the suspending bracket 61, and is joined with a vehicle width direction outside end of a lower side suspension member, for example, a lower arm 71. The lower arm 71 is an arm constituting the lower side suspension member of the strut type suspension device. The lower arm 71 extends in the vehicle width direction and is rotatably joined to a vehicle body side member such as a subframe at the vehicle width direction inside end. The lower arm 71 can swing in the vertical direction with the vehicle width direction inside end as a base end and the vehicle width direction outside end as a free end. In addition, the lower side suspension member may be composed of a plurality of links as another embodiment.

The intermediate portion 63 occupies the vertical direction center region of the suspending bracket 61 and extends in a plate shape, thereby connecting the upper joining seat portion 62 and the lower joining seat portion 64. It is to be noted that the upper joining seat portion 62, the intermediate portion 63, and the lower joining seat portion 64 are integrally formed.

The intermediate portion 63 is mounted and fixed so that the plate-like surface thereof is along the surface of the other side in the axis O direction of the main body casing 43. In a straight traveling state of the wheel (road wheel W), the axis O extends in the vehicle width direction. The plate-like intermediate portion 63 has a through hole 65 extending through the plate thickness and a notch portion 66, which is a recess portion formed so as to notch the edge of the plate material. As shown in FIG. 4, the through hole 65 is formed in each of the upper front portion, the upper rear portion, the lower front portion, and the lower rear portion of the intermediate portion 63. The notch portion 66 is formed by notching the front edge of the intermediate portion 63, and receives a raised portion 43e formed on the back surface portion 43b of the main body casing 43. For this reason, as shown in FIG. 4 and FIG. 7, the intermediate portion 63 is formed in a U shape or a C shape. In other words, the suspending bracket 61 is formed in a substantially U shape or substantially C shape.

As shown in FIG. 6A, a projection 43g is formed on each of the upper edge and the lower edge of the raised portion 43e. The upper projection 43g protrudes upward and the lower projection 43g protrudes downward. The surface of the projection 43g is oriented to the vehicle width direction inside. The back surface of the projection 43g is oriented to the vehicle width direction outside and faces the back surface portion 43b. A through hole 43h corresponding to each of the through holes 65 is formed in each of the projections 43g.

As shown in FIG. 6A, a bolt 69 is passed through each of the through holes 43h from the vehicle width direction inside. The shaft portion of each of the bolts 69 extends in parallel with the axis O and sequentially penetrates the through hole 43h and the through hole 65, and the end portion of the bolt 69 protrudes from the back surface of the intermediate portion 63. The end portion of the bolt 69 is screwed with a nut 70 in an external space of the main body casing 43. By fastening the bolt 69 and the nut 70 with each other, the projection 43g of the main body casing 43 and the intermediate portion 63 of the suspending bracket 61 are clamped by the bolt 69 head portion and the nut 70. As a result, the suspending bracket 61 is firmly mounted and fixed to the main body casing 43. It is to be noted that the upper joining seat portion 62 and the lower joining seat portion 64 of the suspending bracket 61 are separated from the main body casing 43. Alternatively, as a variation, the upper joining seat portion 62 and/or the lower joining seat portion 64 may contact the outer wall surface of the main body casing 43.

As shown in FIG. 4, since the intermediate portion 63 is in the rear of the vehicle, and the notch portion 66 is in the front of the vehicle, the notch portion 66 is open to the front of the vehicle. Then, as shown in FIG. 6A, the intermediate portion 63 is aligned between the projection 43g and the back surface portion 43b, and the notch portion 66 is inserted from the rear of the vehicle into the raised portion 43e.

The notch portion 66 of the intermediate portion 63 receives a part of the main body casing 43 and the through hole 65 of the intermediate portion 63 arranged around the notch portion 66 is mounted and fixed to the main body casing 43 by the fixing means (bolt 69 and nut 70). As a result, the intermediate portion 63 is fixed in close contact with the main body casing 43, thereby reinforcing the rigidity of the main body casing 43.

The main body casing 43 is made of a light metal and is a casting containing, for example, aluminum as a principal component. Further, the suspending bracket 61 is made of steel and is greater than the main body casing 43 in rigidity. In the present embodiment, the bolt 69, the nut 70, and the through holes 43h and 65 are provided as fixing means, and the through holes 43h and 65 are not female screw holes but round holes. According to the present embodiment, since the through hole 43h as a round hole is provided in the main body casing 43, it is unnecessary to provide a female screw hole in the main body casing 43. Further, according to the present embodiment, since the through hole 65 as a round hole is provided in the suspending bracket 61, it is not necessary to provide a female screw hole in the suspending bracket 61. Alternatively, as a variation, the suspending bracket 61 may be made of a light metal and may be a casting containing, for example, aluminum as a principal component.

Here, in addition, as a fixing means for mounting and fixing the suspending bracket 61 to the main body casing 43, instead of the embodiment shown in FIG. 6A, the variation shown in FIG. 6B may be adopted. In the fixing means of the variation, a female screw hole 65m is formed in the intermediate portion 63 instead of the through hole 65 of the round hole. Each of the bolts 69 is screwed into the female screw hole 65m. As a result, the nut 70 (FIG. 6A) can be omitted.

Figure 8:
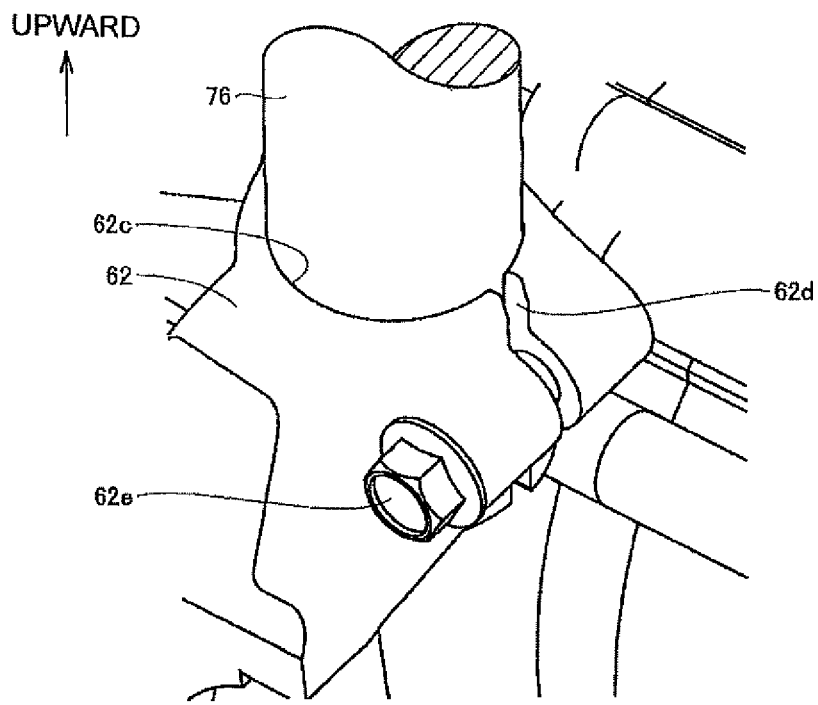
FIG. 8 is a perspective view showing an upper portion of the suspending bracket in an enlarged manner.
Figure 9:
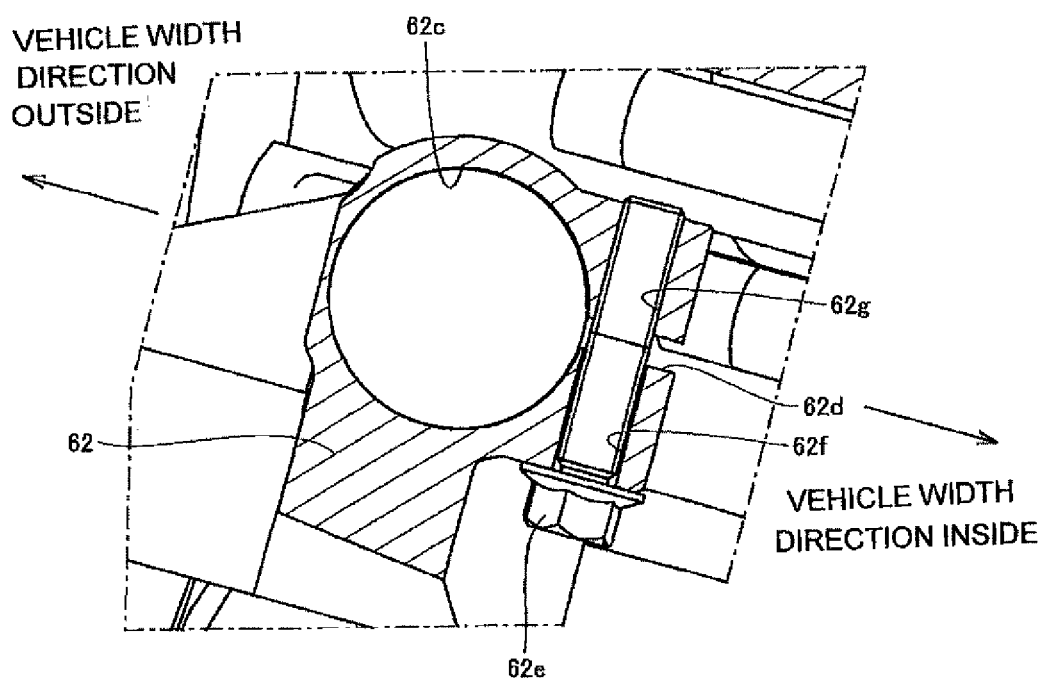
FIG. 9 is a sectional view showing the upper portion of the suspending bracket.

FIG. 8 is a perspective view showing an upper portion of the suspending bracket in an enlarged manner. FIG. 9 is a sectional view showing the upper portion of the suspending bracket and showing a state in which the in-wheel motor drive device is cut along the plane S-S in FIG. 5 and viewed in the direction of the arrow. It is to be noted that the strut is not illustrated in FIG. 9 in order to avoid complication. The upper joining seat portion 62 of the suspending bracket 61 has a through hole 62c having a circular cross section and opening upward. The cylindrical wall portion defining the through hole 62c is formed in a substantially C-shaped cross section with a slit (gap) 62d opening in the circumferential direction. Further, a through hole 62f and a female screw hole 62g through which a bolt 62e passes are formed in the upper joining seat portion 62 so as to extend in one row via the slit 62d.

By passing the strut 76 through the through hole 62c and tightening the bolt 62e, the slit 62d becomes narrow, and the strut 76 is firmly joined and fixed to the upper joining seat portion 62.

Figure 10:
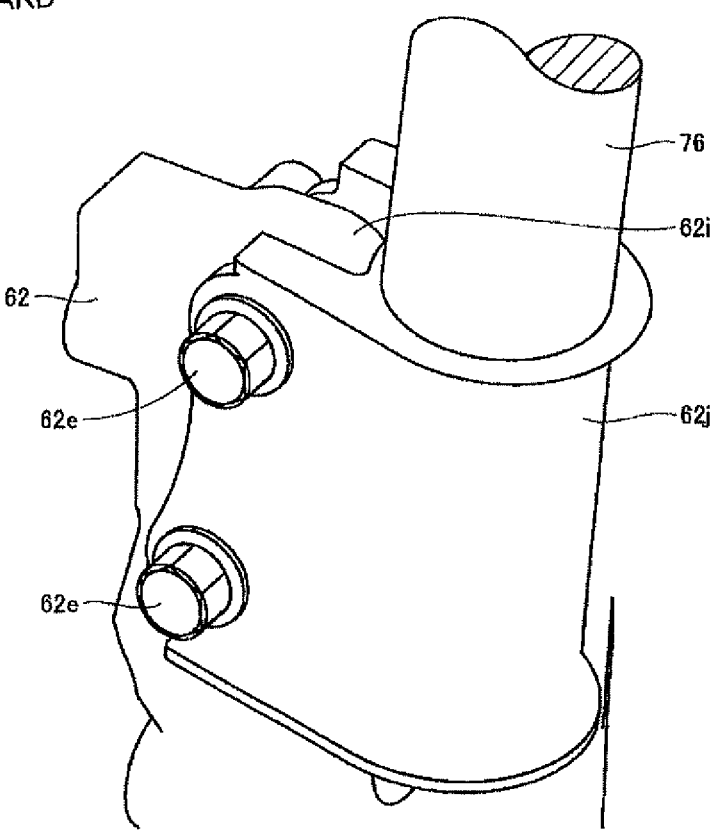
FIG. 10 is a perspective view showing a variation of the upper portion of the suspending bracket.
Figure 11:
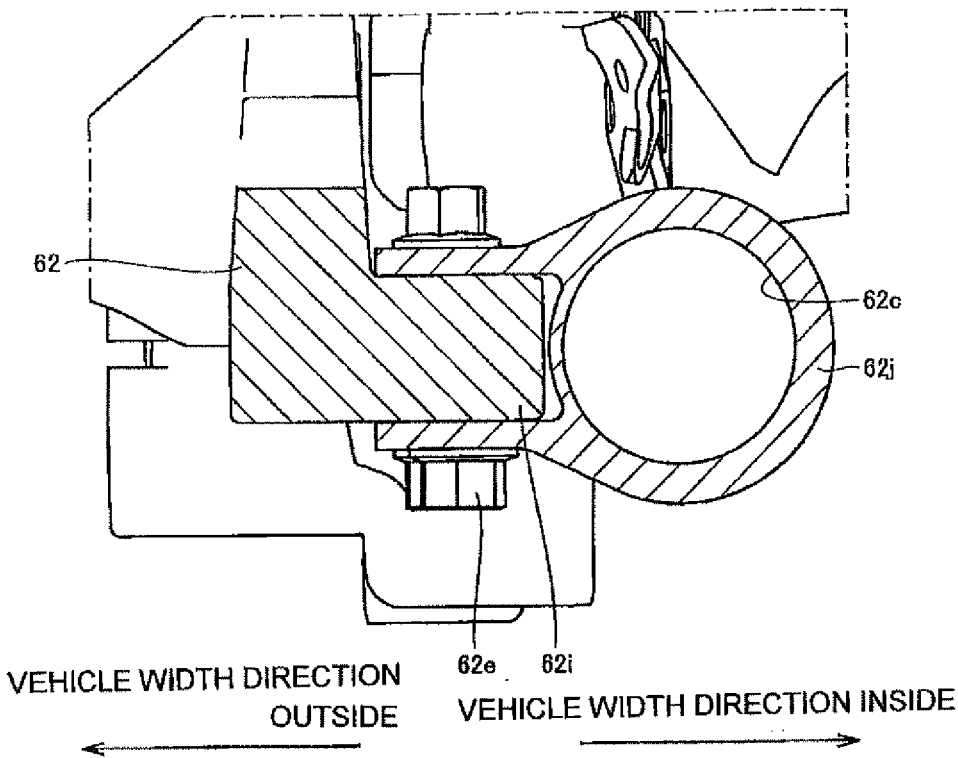
FIG. 11 is a sectional view showing a variation of FIG. 10.

In the embodiment shown in FIG. 8, FIG. 9, and the like, the upper joining seat portion 62 is one member, and a joining tool (bolt 62e) is attached. Alternatively, as a variation of the embodiment shown in FIG. 8, FIG. 9, and the like, the upper joining seat portion 62 may be formed of two members and a joining tool may be additionally attached. FIG. 10 is a perspective view showing a variation of the upper portion of the suspending bracket. FIG. 11 is a sectional view showing a variation of FIG. 10.

The upper joining seat portion 62 of the variation includes a plate-shaped base portion 61i and a joining member 62j having a C shaped cross section. The base portion 61i is inserted in a circumferential gap of the joining member 62j. Similarly to the above-described through hole 62f and the female screw hole 62g, a through hole and a female screw hole through which the bolt 62e passes are formed in the joining member 62j so as to extend in one row via a circumferential gap. A through hole through which the bolt 62e passes is formed also in the base portion 61i.

The strut 76 is firmly joined and fixed to the upper joining seat portion 62 by passing the strut 76 through the center hole of the joining member 62j and tightening the bolt 62e.

Figure 12:
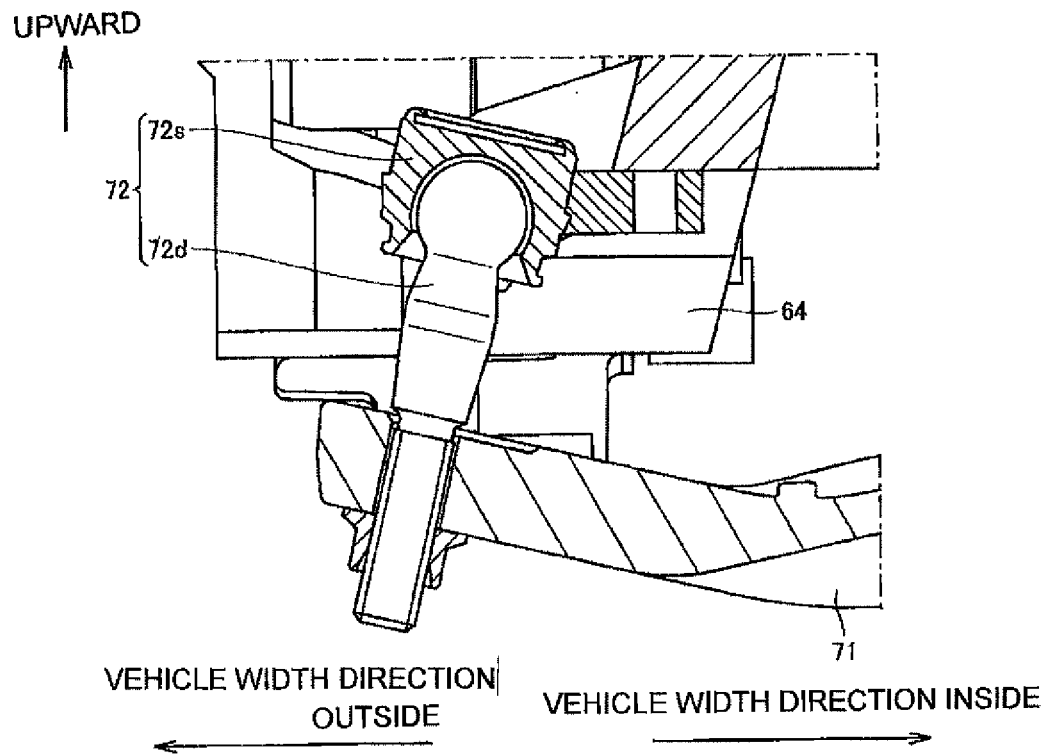
FIG. 12 is a sectional view showing a lower portion of the suspending bracket.
Figure 13:
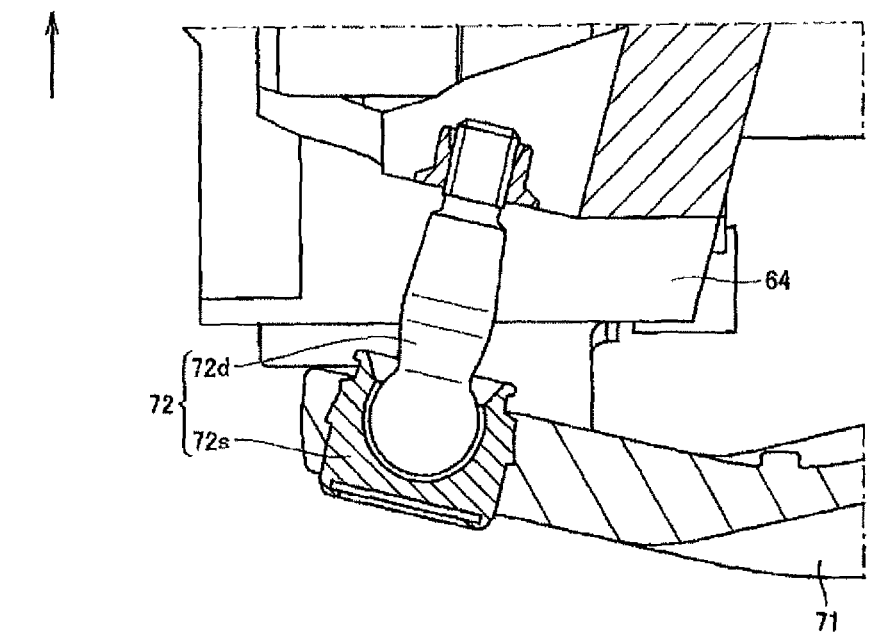
FIG. 13 is a sectional view showing a variation of the lower portion of the suspending bracket.

FIG. 12 is a sectional view showing a lower portion of the suspending bracket, in which the encircled portion indicated by C in FIG. 5 is enlarged. Returning to the explanation of the first embodiment, a socket 72s of a ball joint 72 is mounted to the lower connection seat 64 of the suspending bracket 61 by a bolt 64b as a fixing means. The socket 72s is a downward opening. A ball stud 72d of the ball joint 72 is erected on the lower arm 71. The lower end of the ball stud 72d is nut-fixed to the vehicle width direction outside end of the lower arm 71, and the upper end thereof has a ball portion. The ball portion of the ball stud 72d slidably slides on the socket 72s. As a result, the ball stud 72d is directionally-freely joined to the socket 72s. FIG. 13 is a sectional view showing a variation of the lower portion of the suspending bracket. The difference from FIG. 12 is that the ball joint 72 is provided upside down.

The suspending bracket 61 further includes a tie rod arm 67. The tie rod arm 67 is arranged on the opposite side of the notch portion 66 and is integrally formed with the intermediate portion 63. When the suspending bracket 61 is mounted and fixed to the vehicle width direction inside portion of the in-wheel motor drive device 10, the tie rod arm 67 extends rearward of the vehicle as shown in FIG. 4. At the end of the tie rod arm 67, a tie rod joining seat portion, such as a round hole for receiving the ball joint, is formed. A tie rod (not shown) is joined to the tie rod joining seat portion at the tip end of the tie rod arm 67.

When the tie rod is pushed and pulled in the vehicle width direction by a steering device (not shown), the in-wheel motor drive device 10 including the suspending bracket 61 is turned together with the wheels. A steering axis K, which is the center of steering, is a straight line passing through the upper end of the strut 76 and the ball joint 72 and extending in the vertical direction.

Figure 14:
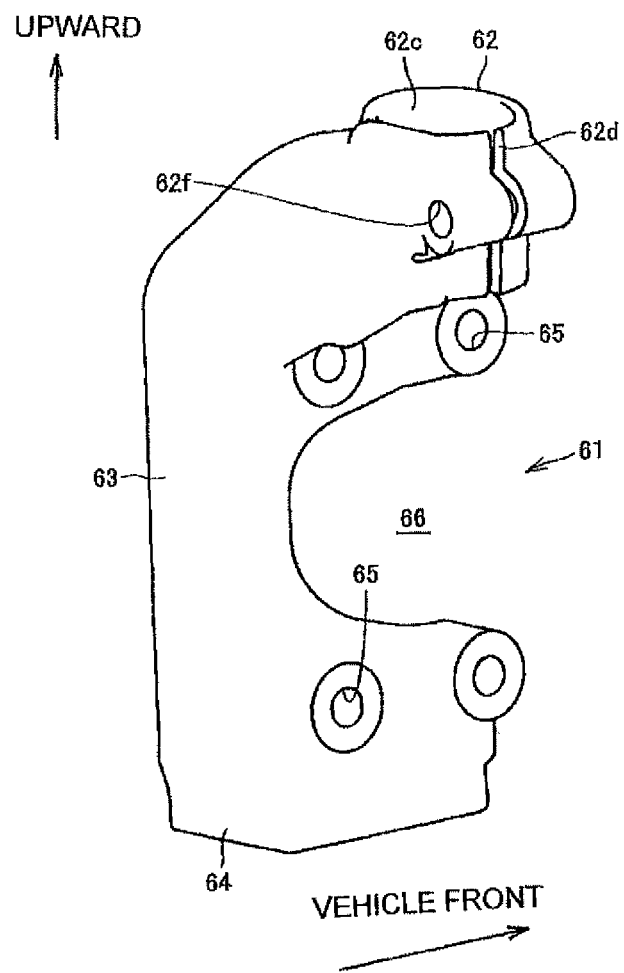
FIG. 14 is a perspective view showing the suspending bracket of a first variation.

Next, a suspending bracket of a first variation will be described. FIG. 14 is a perspective view showing the suspending bracket of the first variation. With respect to this variation, identical reference numerals are given to the configurations common to the above-described embodiments and the description thereof will be omitted, and different configurations will be described below. In the suspending bracket 61 of the first variation, the tie rod arm is omitted. Instead, the tie rod arm is integrally formed with, for example, the main body casing 43.

Figure 15:
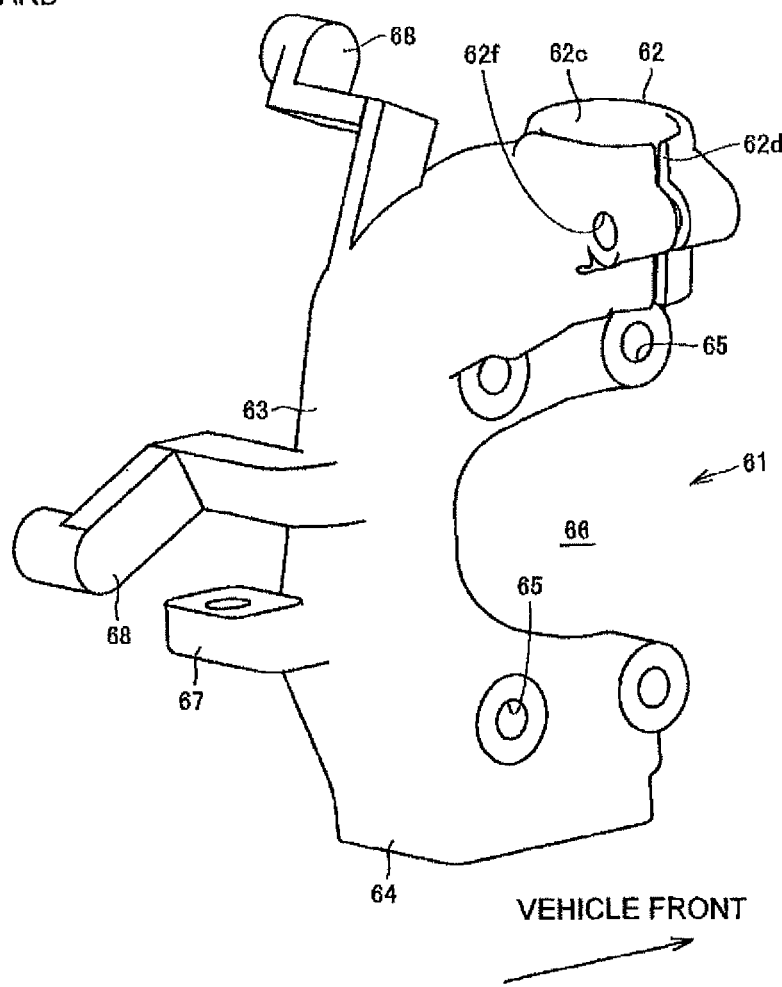
FIG. 15 is a perspective view showing the suspending bracket of a second variation.

Next, a suspending bracket according to a second variation will be described. FIG. 15 is a perspective view showing the suspending bracket of the second variation. With respect to this variation, identical reference numerals are given to the configurations common to the above-described embodiments and the description thereof will be omitted, and different configurations will be described below. The suspending bracket 61 of the second variation further includes two brake caliper arms 68. Each of the brake caliper arms 68 is arranged on the opposite side of the notch portion 66 and is formed integrally with the intermediate portion 63. As shown in FIG. 4, when the suspending bracket 61 is mounted and fixed to the vehicle width direction inside portion of the in-wheel motor drive device 10, one of the brake caliper arms 68 extends rearward of the vehicle and the other brake caliper arm 68 extends upward.

At the end of each of the brake caliper arms 68, a brake caliper joining seat portion, such as a female screw hole (not shown) for receiving a bolt, is formed. A brake caliper (not shown) is joined to the brake caliper joining seat portion at the end of each of the brake caliper arms 68, and the two brake caliper arms 68 support the brake caliper at the both sides. The brake caliper is arranged along the outer edge of the brake disc BD (FIG. 3) and puts a brake on the wheel (road wheel W) by clamping the brake disc BD. The brake caliper may be driven by hydraulic pressure or may be driven by an electric actuator, and thus the mechanism is not particularly limited.

Figure 16:
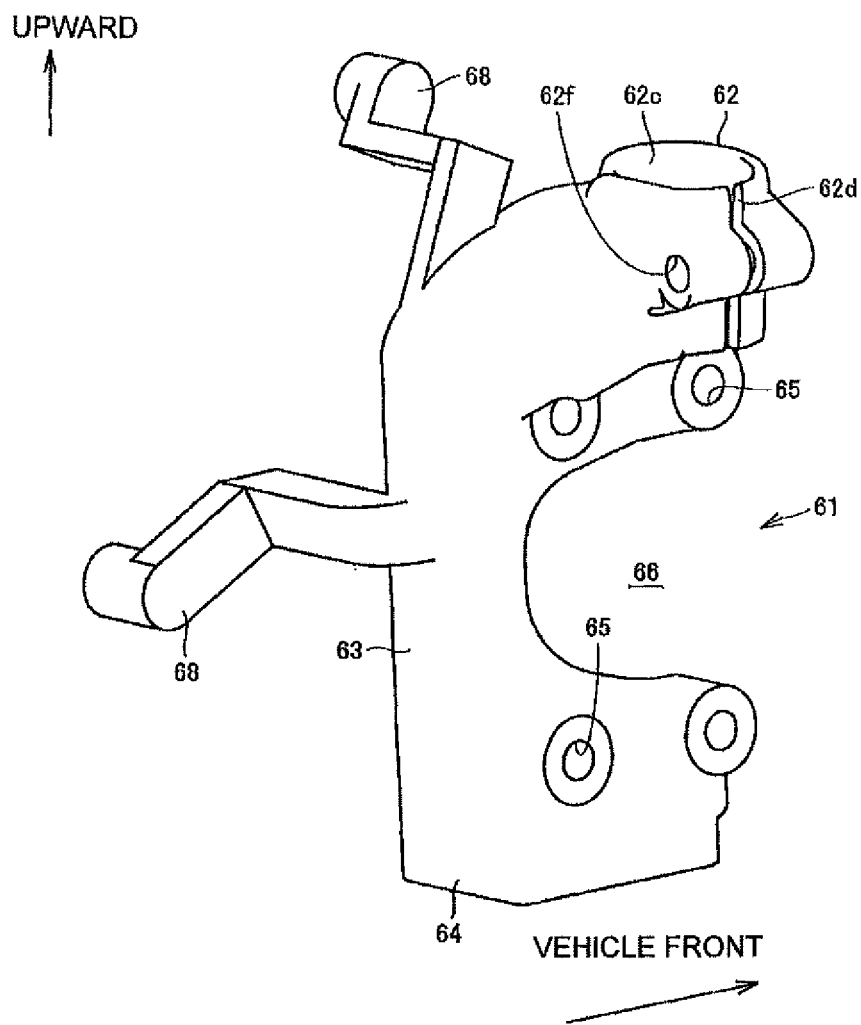
FIG. 16 is a perspective view showing the suspending bracket of a third variation.

Next, a suspending bracket according to a third variation will be described. FIG. 16 is a perspective view showing the suspending bracket of the third variation. With respect to this variation, identical reference numerals are given to the configurations common to the above-described embodiments and the description thereof will be omitted, and different configurations will be described below. In the suspending bracket 61 of the third variation, the two brake caliper arms 68 are attached to the above-described suspending bracket 61 shown in FIG. 14.

Figure 17:
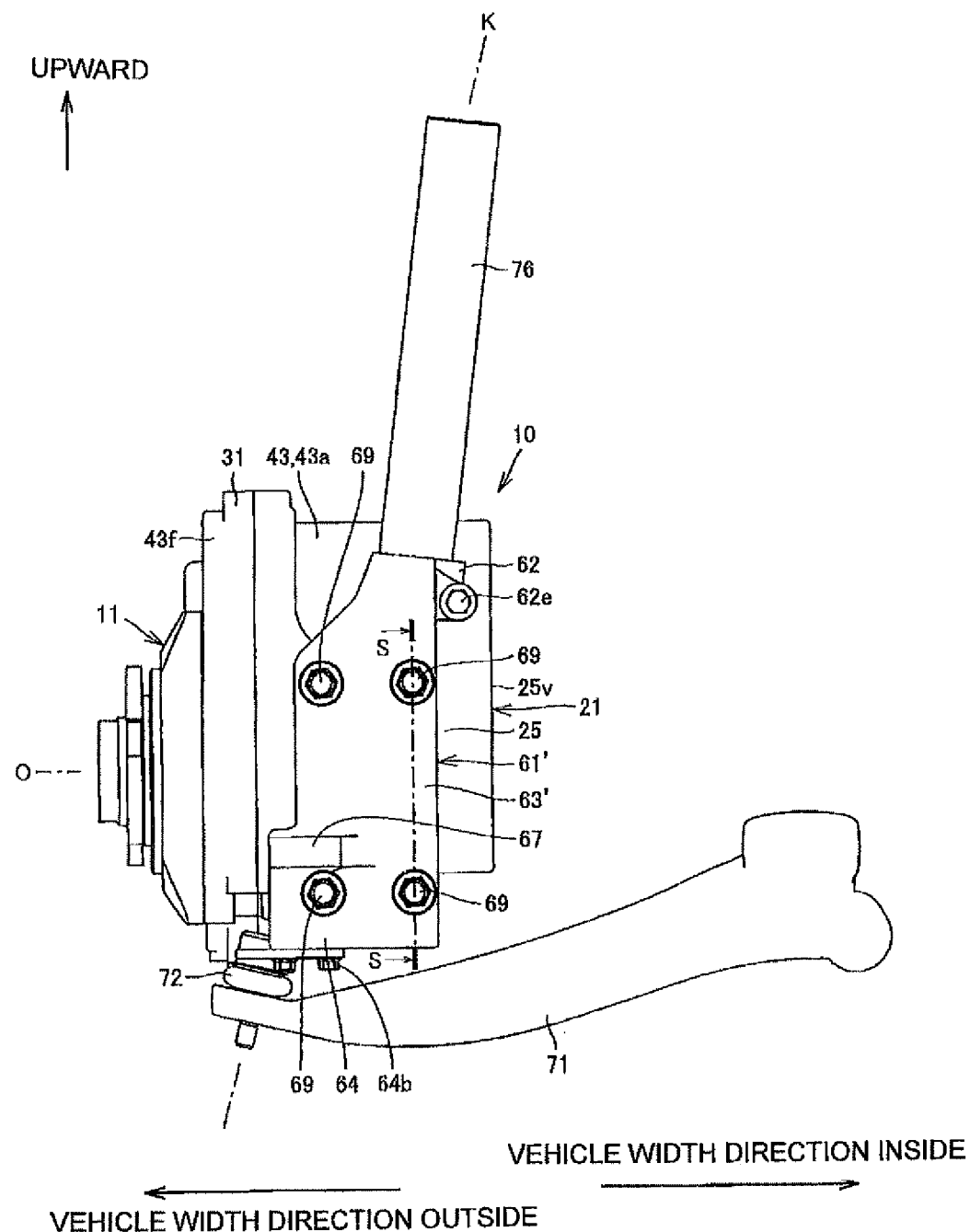
FIG. 17 is a side view showing the in-wheel motor drive device according to a second embodiment of the present invention.

Next, a suspending bracket of a second embodiment will be described. FIG. 17 is a side view showing the in-wheel motor drive device of the second embodiment together with the suspension device, and shows a state of being viewed from the rear of the vehicle. FIG. 18 is a sectional view showing a part of the second embodiment and showing a state in which the in-wheel motor drive device is cut along the plane S-S in FIG. 17 and viewed in the direction of the arrow. FIG. 19 is a perspective view showing the suspending bracket taken out from the second embodiment. With respect to the second embodiment, identical reference numerals are given to the configurations common to the above-described embodiments and the description thereof will be omitted, and different configurations will be described below. A suspending bracket 61' of the second embodiment includes an intermediate portion 63' having a different shape instead of the intermediate portion 63 described above. The intermediate portion 63' is integrally formed with the upper joining seat portion 62, the lower joining seat portion 64, and the tie rod arm 67.

As shown in FIG. 19, the thick, plate-shaped intermediate portion 63' has a rear surface 63r on which the tie rod arm 67 is erected and a front surface on the opposite side. The intermediate portion 63' is mounted and fixed along, as shown in FIG. 17, the rear portion of the main body casing 43. It is to be noted that the rear portion means the behind in the vehicle front/rear direction.

The upper joining seat portion 62 protrudes from the front surface of the intermediate portion 63' and the lower joining seat portion 64 also protrudes from the front surface of the intermediate portion 63'. In this way, the upper joining seat portion 62, the front surface of the intermediate portion 63', and the lower joining seat portion 64 constitute a recess portion 66' surrounding three sides.

Figure 18A:
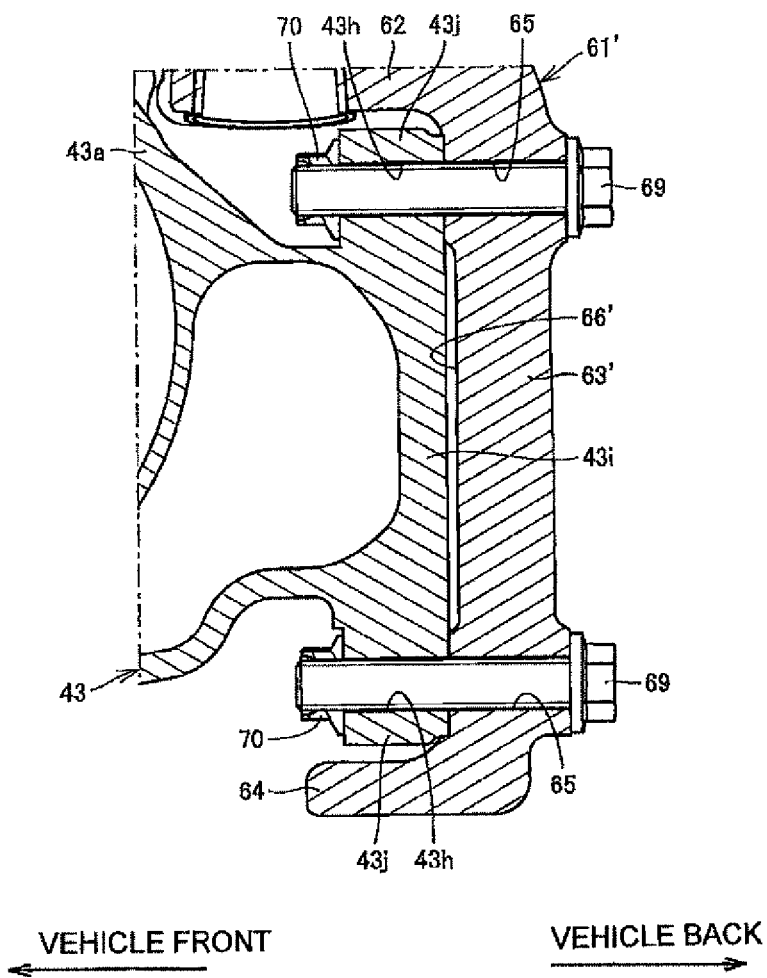
FIG. 18A is a sectional view showing a part of the second embodiment.
Figure 19:
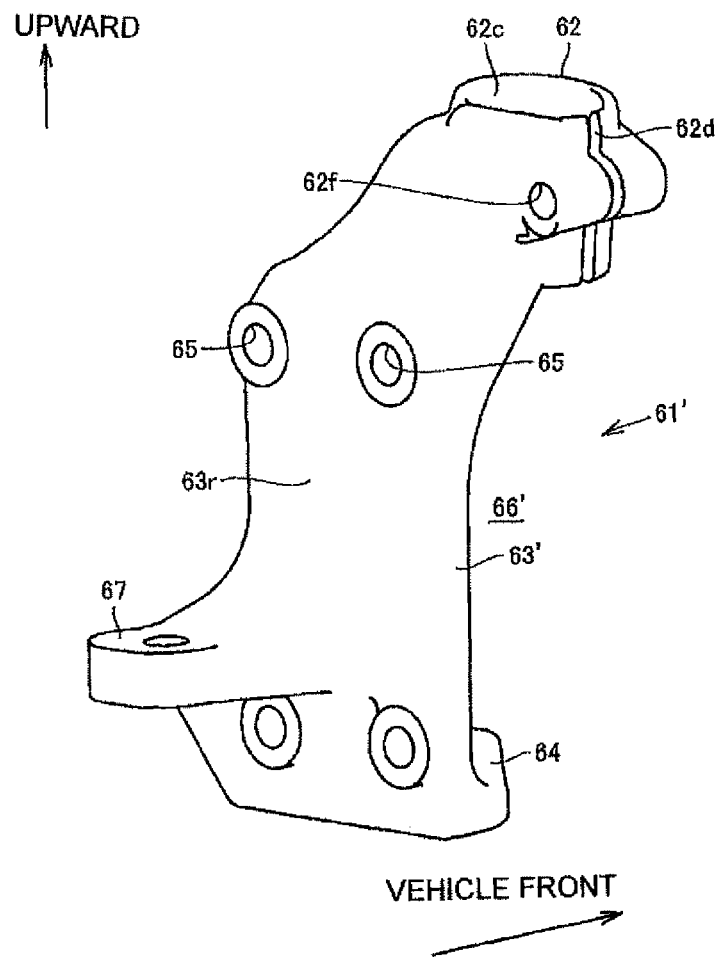
FIG. 19 is a perspective view showing the suspending bracket taken out from the second embodiment.

As shown in FIG. 18A, a raised portion 43i protruding rearward is formed in a circular arc portion 43a, which is the rear portion of the main body casing 43. The circular arc portion 43a is a part of the main body casing 43, lying in a circular arc shape around the axis O to cover the output shaft 41. The raised portion 43i is received in the recess portion 66' from the rear. A projection 43j is formed on each of the upper edge and the lower edge of the raised portion 43i. The upper projection 43j protrudes upward and the lower projection 43j protrudes downward. The surface of the projection 43j is oriented to the rear of the vehicle. The back surface of the projection 43j is oriented to the front of the vehicle and faces the circular arc portion 43a of the main body casing 43. The projection 43j is received in the recess portion 66' from the rear. The through hole 43h corresponding to each of the through holes 65 is formed in each of the projections 43j.

As shown in FIG. 18A, the intermediate portion 63' covers the raised portion 43i and the projection 43j from the rear. The bolt 69 passes through each of the through holes 65 of the intermediate portion 63' and each of the through holes 43h of the main body casing 43 from the rear of the vehicle. The shaft portion of each of the bolts 69 extends toward the front of the vehicle, sequentially penetrates the through hole 65 and the through hole 43h, and protrudes from the back surface of the projection 43j. The end portion of the bolt 69 is screwed with the nut 70 in the internal space of the main body casing 43. By fastening the bolt 69 and the nut 70 with each other, the projection 43j of the main body casing 43 and the intermediate portion 63' of the suspending bracket 61' are clamped by the bolt 69 head portion and the nut 70. As a result, the suspending bracket 61' is firmly mounted and fixed to the main body casing 43.

The recess portion 66' of the intermediate portion 63' receives a part of the main body casing 43 and the through hole 65 of the intermediate portion 63' arranged around the recess portion 66' is mounted and fixed to the main body casing 43 by the fixing means (bolt 69 and nut 70). As a result, the intermediate portion 63' reinforces the rigidity of the main body casing 43.

Figure 18B:
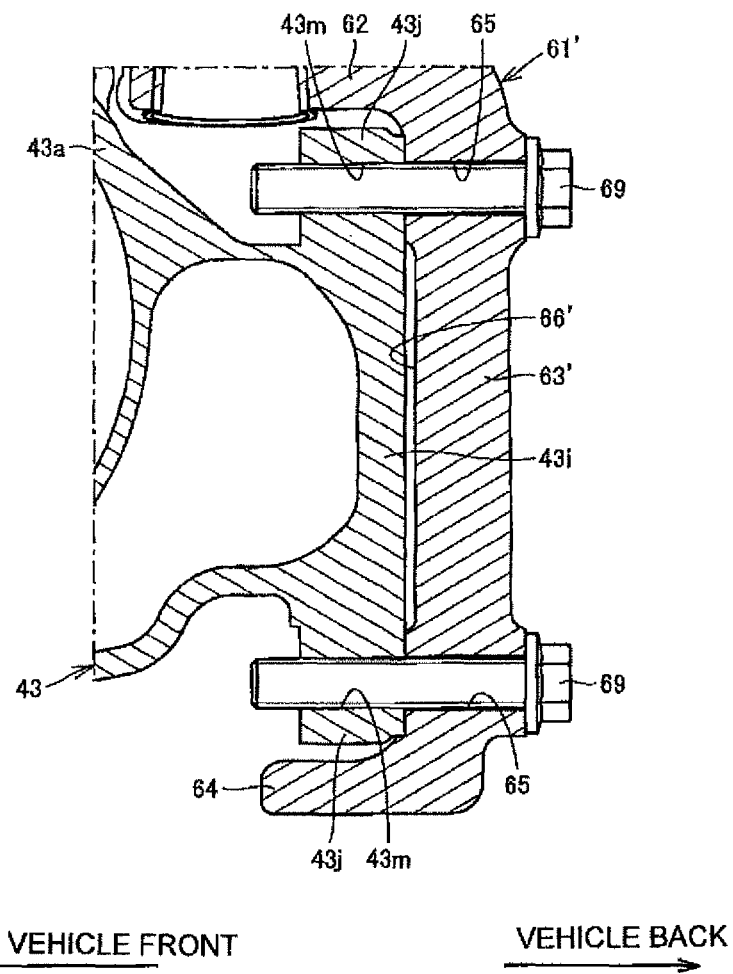
FIG. 18B is a sectional view showing a variation of FIG. 18A.

Here, in addition, as a fixing means for mounting and fixing the suspending bracket 61' to the main body casing 43, instead of the embodiment shown in FIG. 18A, a variation shown in FIG. 18B may be adopted. In the fixing means of the variation, a female screw hole 43m is formed in the projection 43j. Each of the bolts 69 is screwed into the female screw hole 43m. As a result, the nut 70 (FIG. 18A) can be omitted.

Figure 20:
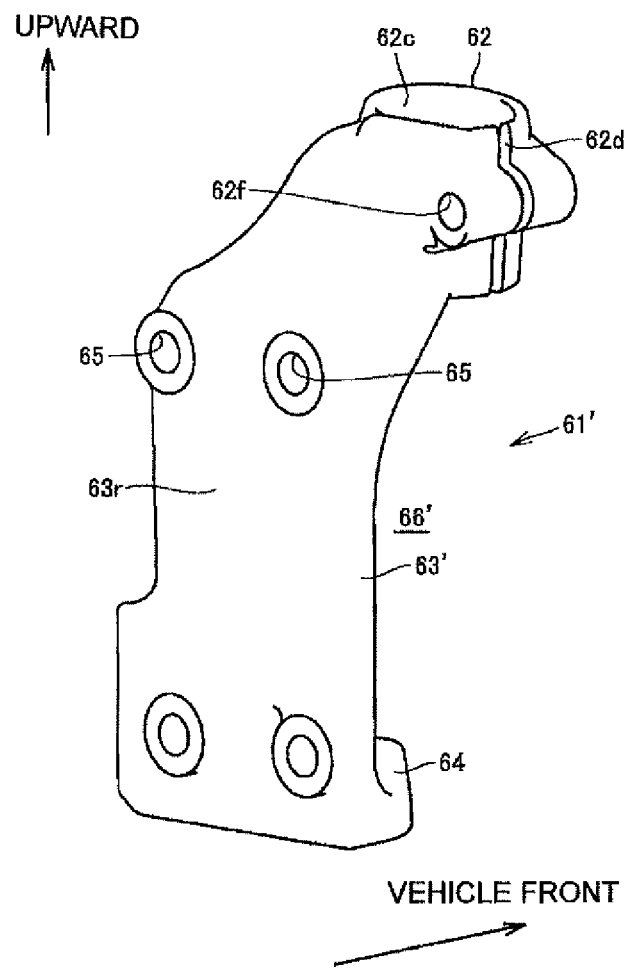
FIG. 20 is a perspective view showing the suspending bracket according to a fourth variation.

Next, a suspending bracket according to a fourth variation will be described. FIG. 20 is a perspective view showing the suspending bracket according to the fourth variation. With respect to this variation, identical reference numerals are given to the configurations common to the above-described embodiments and the description thereof will be omitted, and different configurations will be described below. In the suspending bracket 61' of the fourth variation, the tie rod arm is omitted. Instead, the tie rod arm is integrally formed with, for example, the main body casing 43.

Figure 21:
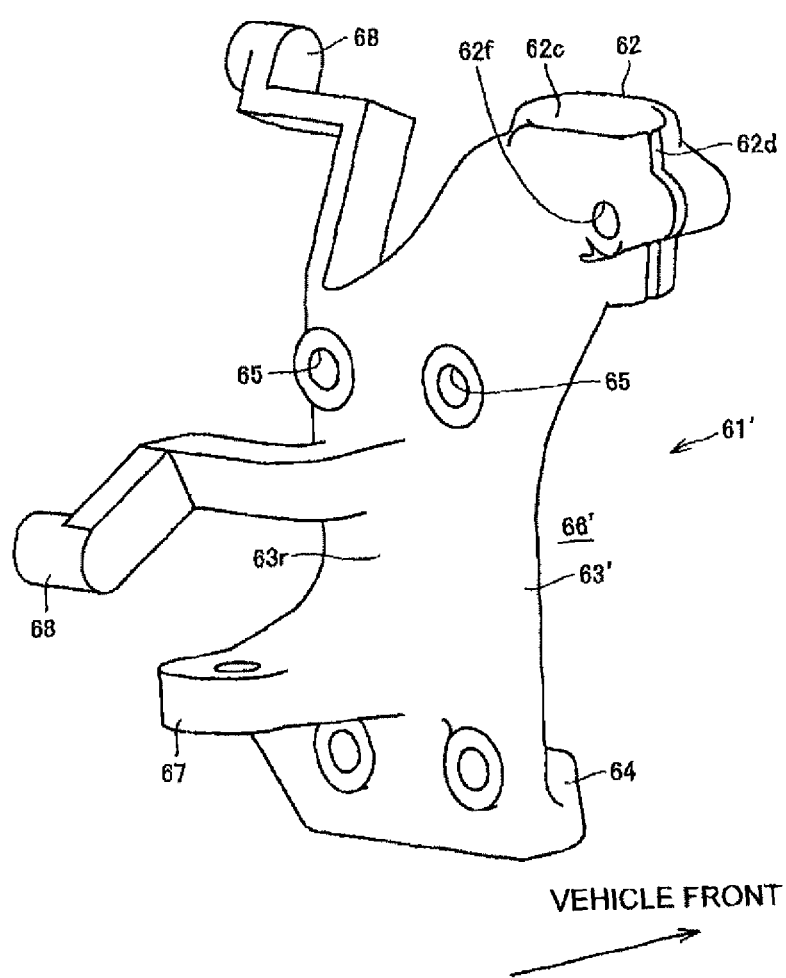
FIG. 21 is a perspective view showing the suspending bracket of a fifth variation.

Next, a suspending bracket according to a fifth variation will be described. FIG. 21 is a perspective view showing the suspending bracket of the fifth variation. With respect to this variation, identical reference numerals are given to the configurations common to the above-described embodiments and the description thereof will be omitted, and different configurations will be described below. The suspending bracket 61' of the fifth variation further includes two brake caliper arms 68. Each of the brake caliper arms 68 is arranged on the opposite side of the recess portion 66' and is integrally formed in the intermediate portion 63'. As shown in FIG. 4, when the suspending bracket 61' is mounted and fixed to the rear portion of the in-wheel motor drive device 10, one of the brake caliper arms 68 extends rearward of the vehicle and the other brake caliper arm 68 extends upward. A brake caliper (not shown) is joined to the end of each of the brake caliper arms 68, and supports the brake caliper at the both sides. The brake caliper is arranged along the outer edge of the brake disc BD shown in FIG. 4 and puts a brake on the wheel (road wheel W) by clamping the brake disc BD.

Figure 22:
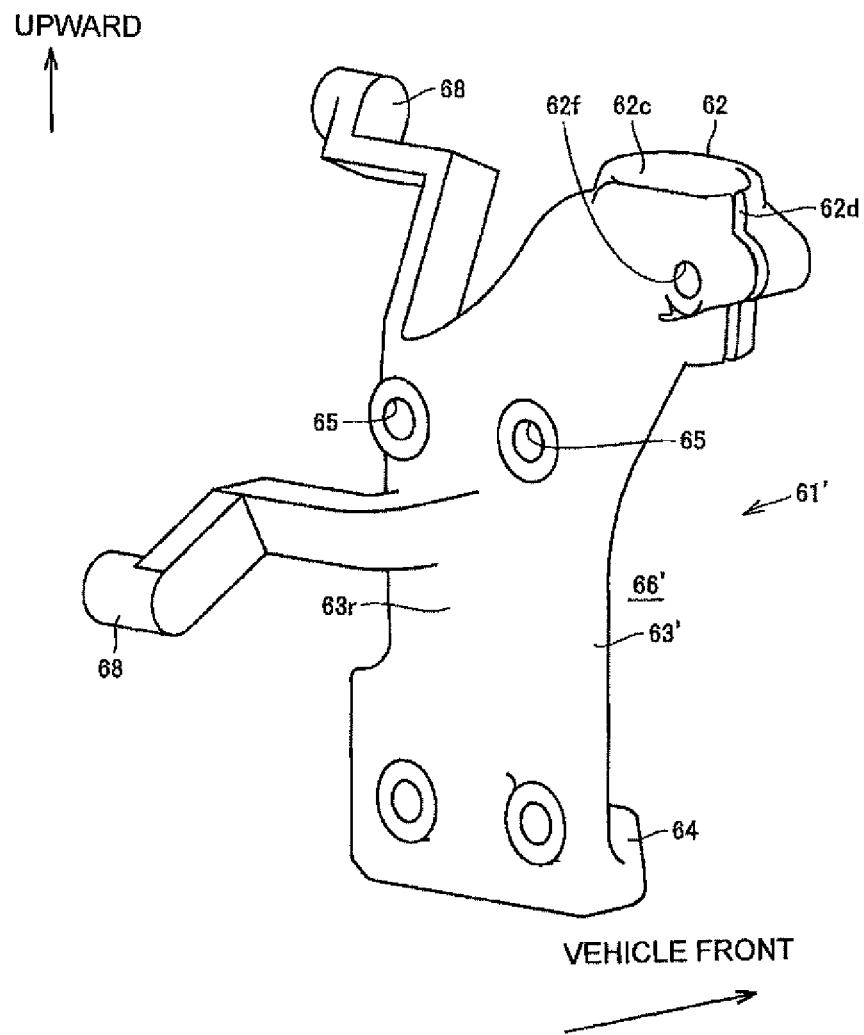
FIG. 22 is a perspective view showing the suspending bracket according to a sixth variation.

Next, a suspending bracket according to a sixth variation will be described. FIG. 22 is a perspective view showing the suspending bracket according to the sixth variation. With respect to this variation, identical reference numerals are given to the configurations common to the above-described embodiments and the description thereof will be omitted, and different configurations will be described below. In the suspending bracket 61' of the sixth variation, the two brake caliper arms 68 are attached to the above-described suspending bracket 61' shown in FIG. 20.

Figure 23:
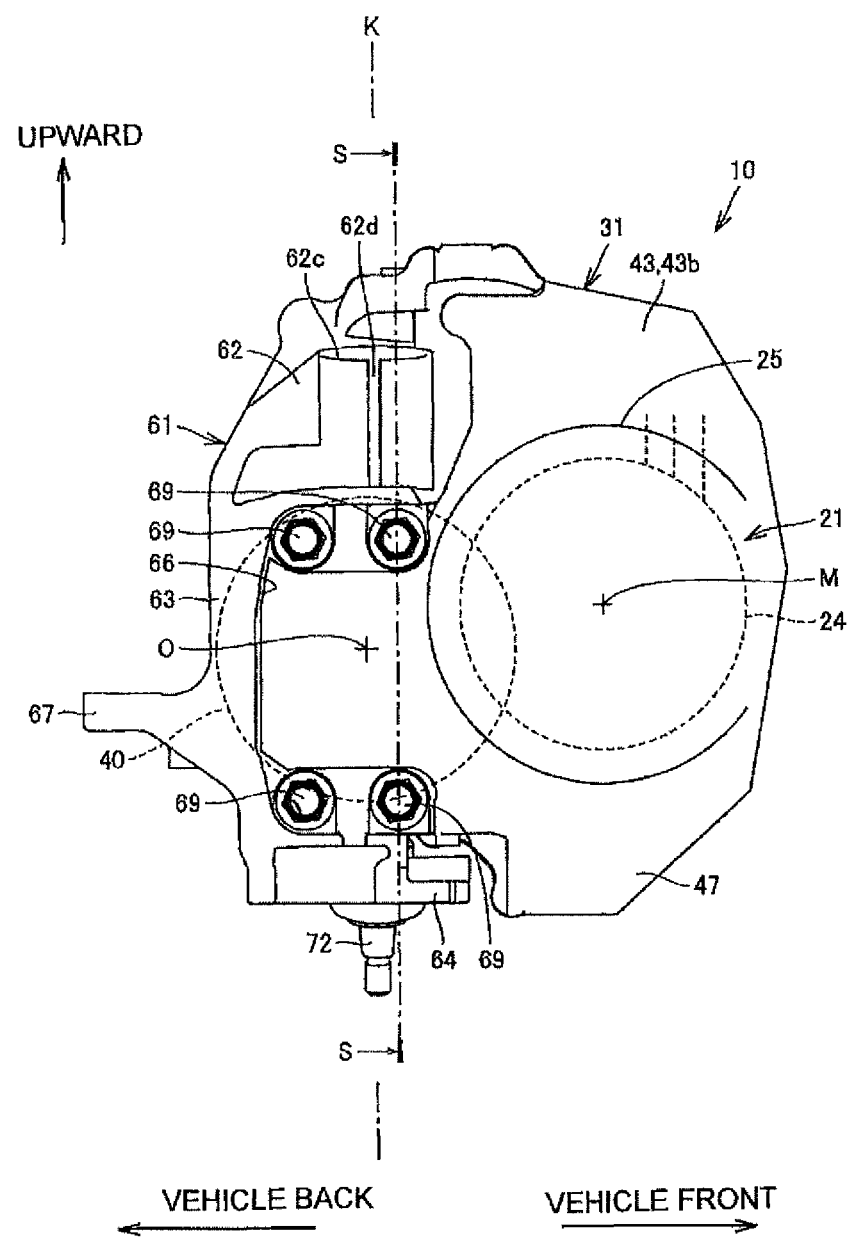
FIG. 23 is a rear view showing the in-wheel motor drive device according to a third embodiment of the present invention.
Figure 24:
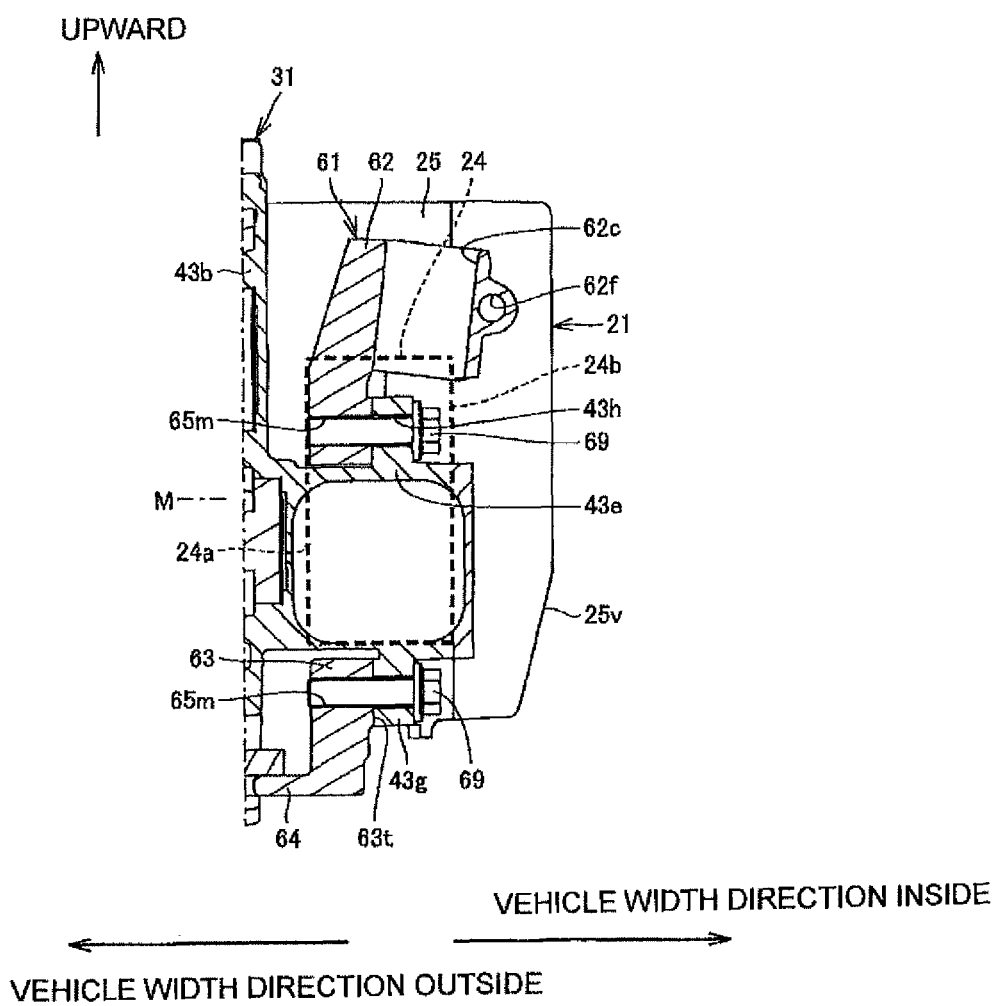
FIG. 24 is a sectional view showing a part of the third embodiment.
Figure 25:
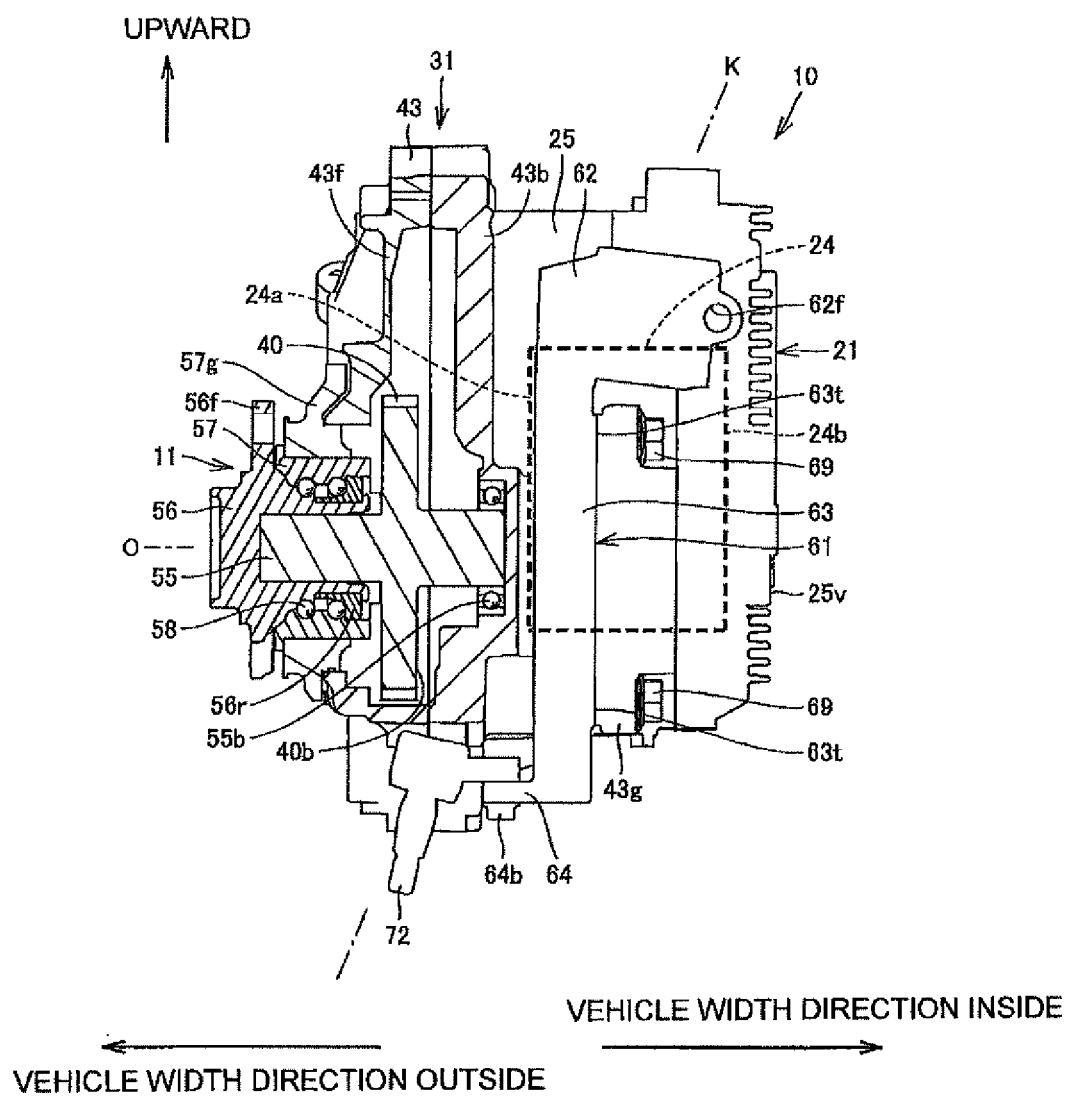
FIG. 25 is a sectional view showing another part of the third embodiment.

Next, a suspending bracket of a third embodiment will be described. FIG. 23 is a rear view showing the in-wheel motor drive device according to the third embodiment, and shows a state of being viewed from the vehicle width direction inside. FIG. 24 is a sectional view showing a part of the third embodiment and showing a state in which the suspending bracket is cut along the plane S-S in FIG. 23 and viewed in the direction of the arrow. FIG. 25 is a sectional view showing a part of the third embodiment, and shows a cross section obtained by cutting the wheel hub bearing portion 11 and the main body casing 43 with a plane extending in the vertical direction including the axis O. With respect to the third embodiment, identical reference numerals are given to the configurations common to the above-described embodiments and the description thereof will appropriately be omitted, and different configurations will be described below.

Similarly to the above suspending bracket 61 shown in FIG. 7, the suspending bracket 61 of the third embodiment is joined and fixed to the projection 43g of the main body casing 43. The intermediate portion 63 of the suspending bracket 61 has the female screw hole 65m and a butting plane 63t as a casing mounting seat portion. Each of the butting surface 63t is perpendicular to the axis O. The butting surface 63t further upward than the axes O and M and the butting surface 63t further downward than the axes O and M are flush but separated from each other. Each of the female screw holes 65m is formed on the butting surface 63t and extends in parallel with the axes O and M.

The motor casing 25 of the motor portion 21 protrudes to the vehicle width direction inside from the main body casing 43 and houses the cylindrical stator 24. In FIG. 23 to FIG. 25, a stator core of the stator 24 is indicated by a broken line. The stator core is a laminated steel plate stacked in the axis M direction. One end surface 24a in the axis M direction of the stator core is oriented to the vehicle width direction outside (outboard side), and the other end surface 24b in the axis M direction of the stator core is directed to the vehicle width direction inside (inboard side).

The butting surface 63t of the casing mounting seat portion is arranged within a range from the one end surface 24a in the axis M direction to the other end surface 24b in the axis M direction as viewed in the vehicle front/rear direction, as shown in FIG. 24. In addition, the casing mounting seat portion (the female screw hole 65m and the butting surface 63t) is arranged so as to overlap with the stator 24, and moreover, is arranged within the range from the one end surface 24a in the axis M direction to the other end surface 24b in the axis M direction.

The casing mounting seat portion of the suspending bracket 61 is coupled to the main body casing 43 with the bolt 69. As shown in FIG. 24 and FIG. 25, as viewed in the vehicle front/rear direction, the bolt 69 as a fixing means and the through hole 43h are arranged so as to overlap with the stator 24, and moreover, are arranged within the range from the one end surface 24a in the axis M direction to the other end surface 24b in the axis M direction. It is to be noted that the vehicle front/rear direction referred here should be understood as the direction perpendicular to the axes O and M.

In FIG. 23, the addendum circle of the output gear 40 is indicated by a broken line. When viewed in the axis O direction of the axle, at least a part of the bolt 69 and the output gear are arranged to overlap with each other. The suspending bracket 61 having a substantially U shape or a substantially C shape is arranged in the vehicle behind the in-wheel motor drive device 10. The axis O passes through the notch portion 66 formed in the intermediate portion 63 and does not intersect with the suspending bracket 61. The intermediate portion 63 is arranged further rearward in the vehicle than the axis O. The axis M also does not intersect with the suspending bracket 61. As shown in FIG. 23, when viewed in the axis O direction, the suspending bracket 61 is arranged further rearward in the vehicle than the motor portion 21 and does not intersect with the motor portion 21.

As shown in FIG. 25, when viewed in the vehicle front/rear direction, the intermediate portion 63 is arranged within a range from the other end surface 40b in the axis O direction to the other end surface 24b in the axis M direction of the output gear 40. Further, as viewed in the vehicle front/rear direction, the intermediate portion 63 overlaps with the steering axis K. However, as shown in FIG. 23, most of the intermediate portion 63 is arranged further rearward in the vehicle than the steering axis K. It is to be noted that the other end surface 40b in the axis O direction should be understood as referring to the other end in the axis O direction of each tooth.

As shown in FIG. 25, the wheel hub bearing portion 11 is an inner ring rotation and outer ring fixed type, and includes an inner ring 56 as a rotating wheel integrally rotating with the wheel, an outer ring 57 as a fixed wheel, and a plurality of rolling elements 58 interposed in these radial gaps. A hub attachment 57g protruding in the outer diameter direction is fixed to the outer circumference of the outer ring 57. The hub attachment 57g is mounted and fixed to the front surface portion 43f of the main body casing 43. One end portion in the axis O direction of the inner ring 56 protrudes from the outer ring 57, and a flange portion 56f is formed. A road wheel (not shown) is joined to each of the flange portions 56f. An inner bearing ring 56r fits on the outer circumference of the other end in the axis O direction of the inner ring 56. The outer circumferential surface of the inner bearing ring 56r constitutes an inner bearing ring in which the rolling elements 58 roll.

The rolling elements 58 are arranged in double rows. The rolling elements 58 of the first row roll on the outer circumferential surface of the center portion in the axis O direction of the inner ring 56. The rolling elements 58 of the second row roll on the outer circumferential surface of the inner bearing ring 56r. The rolling elements 58 of the first row and the second row are front-aligned angular ball bearings. Alternatively, it may be a rear alignment as a variation not shown.

Supplementary explaining the speed reduction portion 31, the output shaft 55 of the output gear 40 extends along the axis O, is inserted into the center hole of the inner ring 56 at one end in the axis O direction, and spline-fitted. The other end in the axis O direction of the output shaft 55 is rotatably supported on the back surface portion 43b via a rolling bearing 55b.

According to the embodiments described so far, the outer ring 12 integrally rotating with the wheel, the wheel hub bearing portion 11, having the inner fixing member 13 facing the outer ring 12 via the radial gap and the plurality of rolling elements 14 interposed in the radial gap, the motor portion 21 for driving the outer ring 12, the main body casing 43 housing a rotation transmission path from the motor rotation shaft 22 of the motor portion 21 to the outer ring 12, the suspending bracket 61 including the upper joining seat portion 62 joinable with the strut 76 of the suspension device, the lower joining seat portion 64 joinable with the arm 71 of the suspension device, and the intermediate portion 63 connecting the upper joining seat portion 62 and the lower joining seat portion 64, and the fixing means (bolt 69) for mounting and fixing the suspending bracket 61 to the outer wall surface of the main body casing 43 are included. With the suspending bracket 61, the in-wheel motor drive device 10 can be joined to the strut type suspension device as shown in FIG. 4.

On the other hand, when the in-wheel motor drive device 10 is joined to another type of suspension device (not shown) such as a strut type suspension device of different size and a double wishbone type suspension device, the suspending bracket 61 shown in FIG. 4 may be replaced with another suitable suspending bracket.

According to the embodiments described so far, the in-wheel motor drive device 10 can be joined to different vehicle types and different suspension devices, and the versatility of the in-wheel motor drive device 10 is enhanced. Also, the main body casing is reinforced by the suspending bracket 61, and its rigidity is increased.

According to the embodiments described so far, the suspending bracket 61 further includes the tie rod arm 67 for joining with the tie rod of a steering device. Due to this, it is possible to steer the in-wheel motor drive device 10 in different vehicle types. Further, the versatility of the in-wheel motor drive device 10 is increased in different steering wheel suspension devices. Further, in the single in-wheel motor drive device 10, the degree of freedom of the mounting layout of the tie rod is increased.

According to the embodiments described so far, the suspending bracket 61 further includes the brake caliper arm 68 for joining with the brake caliper. Due to this, it is possible to attach the brake caliper to the in-wheel motor drive device 10 in different vehicle types. Further, in the single in-wheel motor drive device 10, the degree of freedom of the mounting layout of the brake caliper is increased.

According to the embodiments described so far, the bolt 69 extending in parallel with the axis O of the outer ring 12 and penetrating the suspending bracket 61 and the main body casing 43 is included as a fixing means for mounting and fixing the suspending bracket 61 to the main body casing 43, as shown in FIG. 6A. As a result, it is possible to mount the suspending bracket 61 to the vehicle width direction inside portion of the main body casing 43.

According to the embodiments described so far, the bolt 69 extending in the traveling direction of the vehicle, i.e., the vehicle front/rear direction and penetrating the suspending bracket 61' and the main body casing 43 is included as a fixing means for mounting and fixing the suspending bracket 61 to the main body casing 43, as shown in FIG. 18A. As a result, it is possible to mount the suspending bracket 61' to the rear portion or the front portion of the main body casing 43.

According to the embodiments described so far, the main body casing 43 is provided with the raised portions 43e and 43i, and the suspending bracket 61 and 61' are provided with the notch portion 66 or the recess portion 66'. The suspending bracket 61 and 61' is mounted to the main body casing 43 so that the recess portion receives the raised portion. This increases the rigidity of the mounting part. Further, in the main body casing 43 having a complicated shape, it is possible to firmly fix the suspending bracket 61 and 61' by using the raised portions 43e and 43i of the main body casing 43.

According to the embodiments described so far, the plurality of projections 43g and 43j are erected on the edges of the raised portions 43e and 43i of the main body casing 43, and the through hole 43h is formed in each of the projections 43g and 43j. Also in the suspending bracket 61, the through hole 65 is formed in a part corresponding to the projections 43g and 43j. Then, the through hole 43h of the main body casing 43 and the through hole 65 of the suspending bracket 61 may be matched and bolted with the bolt 69 passing therethrough. As a result, in the thin-walled main body casing 43, only the projections 43g and 43j are thickened, thereby allowing the mounting rigidity to be increased. Further, it is possible to mount and fix the suspending bracket 61 and 61' to the main body casing 43 by screwing the bolt 69 and the nut 70 without providing a female screw hole in the main body casing 43.

While the embodiments of the present invention have been described with reference to the drawings, the present invention is not limited to the embodiments shown in the drawings. Various modifications and variations can be made to the illustrated embodiments within an identical scope or within an equivalent scope to the present invention.

INDUSTRIAL APPLICABILITY

The in-wheel motor drive device according to the present invention is advantageously used in electric vehicles and hybrid vehicles.

REFERENCE SIGNS LIST 10 in-wheel motor drive device
11 wheel hub bearing portion
12 outer ring (rotating wheel)
13 inner fixing member
14 rolling element
15 fixed shaft (fixed wheel)
15r root portion
21 motor portion
22 motor rotation shaft
25 motor casing
25v motor casing cover
31 speed reduction portion
40 output gear
41 output shaft
43 main body casing
43a circular arc portion
43b back surface portion
43e, 43i raised portion
43f front surface portion
43g, 43j projection
43h through hole
43m female screw hole
43p opening
47 oil tank
61, 61' suspending bracket
61i base portion
62 upper joining seat portion
62c through hole
62d slit (gap)
62e bolt
62j joining member
62g female screw hole
63 intermediate portion
64 lower joining seat portion
65 through hole
65m female screw hole
66 recess portion
67 tie rod arm
68 brake caliper arm
69 bolt (fixing means)

70 nut (fixing means)
71 lower Arm (lower side suspension member)
72 ball joint
72*d* ball stud
72*s* socket
76 strut (damper, upper side suspension member)
BD brake disc
K steering axis
M, Nf, Nl, O, P axis
W road wheel
Wr rim portion
Ws spoke portion.

The invention claimed is:

1. An in-wheel motor drive device, comprising:
   a wheel hub bearing portion that has a rotating wheel integrally rotating with a wheel, a fixed wheel facing the rotating wheel via a radial gap, and a plurality of rolling elements interposed in the radial gap;
   a motor portion that drives the rotating wheel;
   a casing that houses a rotation transmission path from a motor rotation shaft of the motor portion to the rotating wheel;
   a suspending bracket that includes an upper joining seat portion and a lower joining seat portion joinable with a suspension device and an intermediate portion that connects the upper joining seat portion and the lower joining seat portion; and
   a fixing means for mounting and fixing the suspending bracket to an outer wall surface of the casing, the fixing means including at least one bolt penetrating the suspending bracket and the casing,
   wherein the suspending bracket has a U shaped or C shaped portion oriented in a vehicle front/rear direction and that forms a recess portion in the suspending bracket, and
   wherein the casing includes a raised portion, the recess portion of the suspending bracket receiving the raised portion.

2. The in-wheel motor drive device according to claim 1, wherein the suspending bracket further includes a tie rod joining seat portion for joining with a tie rod of a steering device.

3. The in-wheel motor drive device according to claim 1, wherein the suspending bracket further includes a brake caliper joining seat portion for joining with a brake caliper.

4. The in-wheel motor drive device according to claim 1, wherein the at least one bolt extends in parallel with an axis of the rotating wheel.

5. The in-wheel motor drive device according to claim 1, wherein the at least one bolt extends in a vehicle front/rear direction and penetrating.

6. The in-wheel motor drive device according to claim 1, wherein the raised portion is in a front portion, a rear portion, or inside of a vehicle width direction, and the intermediate portion has the recess portion.

7. The in-wheel motor drive device according to claim 6, wherein: a projection is erected on an edge of the raised portion, a casing through hole is formed in the projection, a suspending bracket through hole is formed in a part corresponding to the projection on the suspending bracket, and a bolt as the fixing means passing through the casing through hole and the suspending bracket through hole.

* * * * *